United States Patent [19]
Vierheilig

[11] Patent Number: 6,028,023
[45] Date of Patent: Feb. 22, 2000

[54] PROCESS FOR MAKING, AND USE OF, ANIONIC CLAY MATERIALS

[75] Inventor: Albert A. Vierheilig, Savannah, Ga.

[73] Assignee: Bulldog Technologies U.S.A., Inc., Wilmington, Del.

[21] Appl. No.: 08/955,017

[22] Filed: Oct. 20, 1997

[51] Int. Cl.[7] ................................................. B01J 21/16
[52] U.S. Cl. ............................... 502/84; 502/80; 502/85
[58] Field of Search .................................. 502/80, 84, 85

[56] References Cited

U.S. PATENT DOCUMENTS

| | | | |
|---|---|---|---|
| 4,458,026 | 7/1984 | Reichle | 502/80 |
| 4,465,779 | 8/1984 | Occelli et al. | 502/63 |
| 4,744,967 | 5/1988 | Brand et al. | 423/239 |
| 4,866,019 | 9/1989 | van Broekhoven | 502/65 |
| 4,889,615 | 12/1989 | Chin et al. | 208/113 |
| 4,952,382 | 8/1990 | van Broekhoven | 423/244 |
| 4,970,191 | 11/1990 | Schutz | 502/341 |
| 5,112,784 | 5/1992 | Atkins et al. | 502/80 |
| 5,114,691 | 5/1992 | Pinnavaia et al. | 423/244 |
| 5,114,898 | 5/1992 | Pinnavaia et al. | 502/406 |
| 5,153,156 | 10/1992 | Schutz et al. | 502/63 |
| 5,334,564 | 8/1994 | Pinnavaia et al. | 502/84 |
| 5,358,701 | 10/1994 | Pinnavaia et al. | 423/242.1 |
| 5,399,329 | 3/1995 | Schutz et al. | 423/415.1 |
| 5,426,083 | 6/1995 | Bhattacharyya et al. | 502/411 |
| 5,459,118 | 10/1995 | Dai et al. | 502/300 |
| 5,591,418 | 1/1997 | Bhattacharyya | 423/239.1 |

OTHER PUBLICATIONS

Walter T. Reichle, "Synthesis of Anionic Clay Minerals (Mixed Metal Hydroxides, Hydrotalcite)," *Solid State Ionics*, 22, pp. 135–141 (1986).

Miyata, "Physico–Chemical Properties of Synthetic Hydrotalcites in Relation to Composition," *Clays and Clay Minerals*, vol. 28, No. 1, pp. 50–56 (1980).

Pausch, "Syntheses of Disordered and Al–Rich Hydrotalcite–Like Compounds," *Clays and Clay Minerals*, vol. 14, No. 5, pp. 507–510 (1986).

*Primary Examiner*—Thomas Dunn
*Attorney, Agent, or Firm*—Dorr, Carson, Sloan & Birney, P.C.

[57] ABSTRACT

Anionic clay compounds such as hydrotalcite-like compounds can be made by a process wherein a non-hydrotalcite-like compound (or a hydrotalcite-like compound) are heat treated and then hydrated to form hydrotalcite-like compounds having properties (e.g., increased hardness and/or density) that differ from those of hydrotalcite-like compounds made by prior art methods wherein non-hydrotalcite-like compounds (or hydrotalcite-like compounds) are not similarly heat treated and hydrated to form such hydrotalcite-like compounds.

18 Claims, 7 Drawing Sheets

Fig. 11
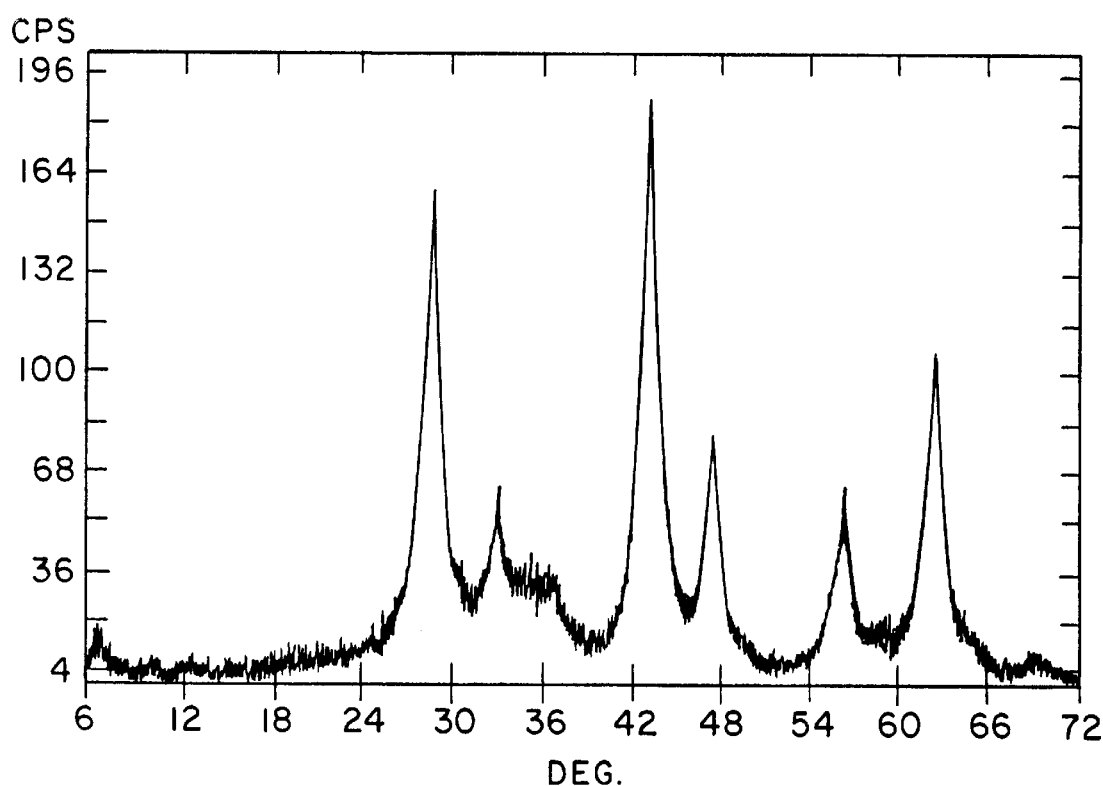
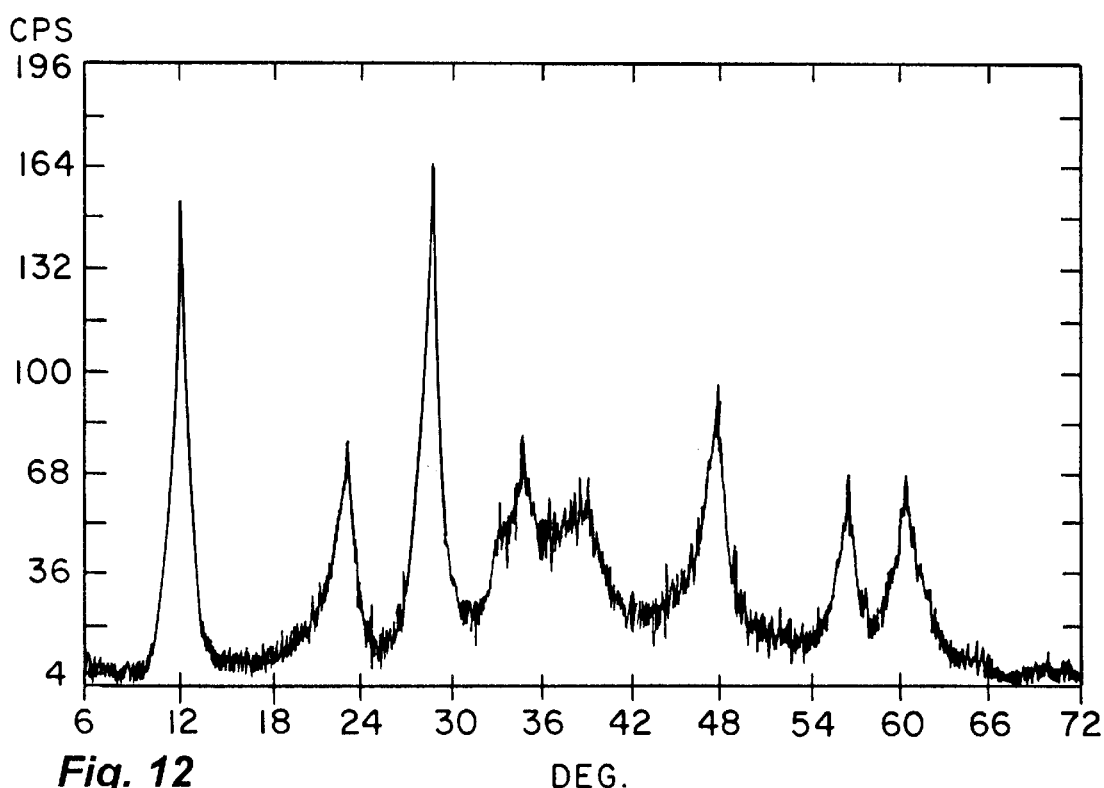
Fig. 12

Time (min.)

PROCESS FOR MAKING, AND USE OF, ANIONIC CLAY MATERIALS

BACKGROUND OF THE INVENTION

This invention is generally concerned with methods of making anionic clays. Such clays are characterized by crystalline structures that consist of positively charged layers that are separated by interstitial anions and/or water molecules. The positively charged layers are often comprised of metal hydroxides of divalent metal cations (e.g., $Mg^{2+}$, $Ca^{2+}$, $Zn^{2+}$, $Mn^{2+}$, $Co^{2+}$, $Ni^{2+}$, $Sr^{2+}$, $Ba^{2+}$ and $Cu^{2+}$) and trivalent metal cations (e.g., $Al^{3+}$, $Mn^{3+}$, $Fe^{3+}$, $Co^{3+}$, $Ni^{3+}$, $Cr^{3+}$, $Ga^{3+}$, $B^{3+}$, $La^{3+}$ and $Gl^{3+}$). The interstitial anions are usually $NO_3$—, $OH$—, $Cl$—, $Cr$—, $I$—, $CO_3^{2-}$, $SO_4^{2-}$, $SIO_3^{2-}$, $HPO_3^{2-}$, $MnO_4$—, $HGaO_3^{2-}$, $HVO_4^{2-}$, $ClO_4$—, $BO_3^{2-}$, monocarboxylates (e.g., acetate) and dicarboxylates (e.g., oxalate), alkyl sulphonates (e.g., lauryl sulphonate) and various combinations thereof.

Therefore, anionic clays are further subdivided according to the identity of the atoms that make up their crystalline structures. For example, anionic clays in the pyroaurite-sjogrenite-hydrotalcite group are based upon brucite-like layers (wherein magnesium cations are octahedrally surrounded by hydroxyl groups) which alternate with interstitial layers of water molecules and/or various anions (e.g., carbonate ions). When some of the magnesium in a brucite-like layer is isomorphously replaced by a higher charged cation, e.g., $Al^{3+}$, then the resulting $Mg^{2+}$—$Al^{3+}$—OH layer gains in positive charge. Hence, an appropriate number of interstitial anions, such as those noted above, are needed to render the overall compound electrically neutral.

The literature also teaches that as the concentration of $Al^{3+}$ increases in a Brucite-type lattice, a reduction of the lattice parameter known as "a", takes place. The lattice parameter known as "c" also is reduced. The reduction in lattice parameter, a, is due to the smaller, plus three charged, $Al^{3+}$ ions substituting for the larger, plus two charged $Mg^{2+}$ ions. This higher charge causes increased coulombic forces of attraction between the positive charged Brucite-type layer and the negative interlayer ions—thus giving rise to a decrease in the size of the interlayer itself.

Natural minerals that exhibit such crystalline structures include, but by no means are limited to, pyroaurite, sjogrenite, hydrotalcite, stichtite, reevesite, eardleyite, mannaseite, barbertonite and hydrocalumite. The chemical formulas for some of the more common synthetic forms of anionic clays would include: $[Mg_6Fe_2(OH)_{16}]CO_3 \cdot 4H_2O$, $[Mg_6Al_2$-$(OH)_{16}]CO_3 \cdot 4H_2O$, $[Mg_6Cr_2(OH)_{16}]CO_3 \cdot 4H_2O$, $[Ni_6$-$Fe_2(OH)_{16}]CO_3 \cdot 4H_2O$, $[Ni_6Al_2(OH)_{16}]CO_3 \cdot 4H_2O$, $[Fe_4Fe_2(OH)_{12}]CO_3 \cdot \#H_2O$, $[Ca_2Al(OH)_6](OH)_{0.75}$-$(CO_3)_{0.125} \cdot 2.5H_2O_6]OH \cdot 6H_2O$, $[Ca_2Al$-$(OH)_6]OH \cdot 3H_2O$, $[Ca_2Al(OH)_6]OH \cdot 2h_2O$, $[Ca_2Al$-$(OH)_6]OH$, $[Ca_2Al(OH)_6]Cl \cdot 2H_2O$, $[Ca_2Al(OH)_6]0.5CO_3 \cdot 2.5H_2O$, $[Ca_2Al(OH)_6] 0.5SO_4 \cdot 3H_2O$, $[Ca_2$—$Fe(OH)_6]0.5SO_4 \cdot 3H_2O$, $[(Ni,Zn)_6Al_2(OH)_{16}]CO_3 \cdot 4H_2O$, $[Mg_6(Ni,Fe)_2(OH)_{16}](OH)_2 \cdot 2H_2O$, $[Mg_6Al_2(OH)_{16-}](OH)_2 \cdot 4H_2O$, $[(Mg_3Zn_3)al_2(OH)_{16}]CO_3 \cdot 4H_2O$, $[Mg_6Al_2(OH)_{16}]SO_4 \cdot xH_2O$, $[Mg_6Al_2(OH)_{16}](NO_3)_2 \cdot x$-$H_2O$, $[Zn_6Al_2(OH)_{16}]CO_3 \cdot xH_2O$, $[Cu_6Al_2(OH)_{16-}]CO_3 \cdot xH_2O$, $[Cu_6Al_2(OH)_{16}]SO_4 \cdot xH_2O$ and $[Mn_6Al_{2-}(OH)_{16}]CO_3 \cdot xH_2O$, wherein x has a value of from 1 to 6.

Those skilled in this art also will appreciate that anionic clays are often referred to as "mixed metal hydroxides." This expression derives from the fact that, as noted above, positively charged metal hydroxide sheets of anionic clays may contain two metal cations in different oxidation states (e.g., $Mg^{2+}$ and $Al^{3+}$). Moreover, because the XRD patterns for so many anionic clays are similar to that of the mineral known as Hydrotalcite, $Mg_6Al_2(OH)_{16}(CO_3) \cdot 4H_2O$, anionic clays also are very commonly referred to as "hydrotalcite-like compounds." This term has been widely used throughout the literature for many years (see for example: Pausch, "Synthesis of Disordered and Al-Rich Hydrotalcite-Like Compounds," Clay and Clay Minerals, Vol. 14, No. 5, 507–510 (1986). Such compounds also are often referred to as "anionic clays." Indeed, the expressions "anionic clay," "mixed metal hydroxides" and "hydrotalcite-like compounds" are often found very closely linked together. For example, in: Reichle, "Synthesis of Anionic Clay Minerals (Mixed Metal Hydroxides, Hydrotalcite)," Solid State Ionics, 22, 135–141 (1986) (at Paragraph 1, page 135) the author states: "The anionic clays are also called mixed metal hydroxides since the positively charged metal hydroxide sheets must contain two metals in different oxidation states. Crystallographically they have diffraction patterns which are very similar or identical to that of hydrotalcite ($Mg_6Al_2(OH)_{16}(CO_3) \cdot 4H_2O$); hence they have also been referred to as hydrotalcites or hydrotalcite-like." (emphasis added). U.S. Pat. No. 5,399,329 (see col.1, lines 60–63) contains the statement: "The term 'hydrotalcite-like' is recognized in this art. It is defined and used in a manner consistent with usage herein in the comprehensive literature survey of the above-referenced Cavani et al. article." Hence, for the purposes of the present patent disclosure, applicant will (unless otherwise stated) use the term "hydrotalcite-like" compound(s) with the understanding that this term should be taken to include anionic clays, hydrotalcite itself as well as any member of that class of materials generally known as "hydrotalcite-like compounds." Moreover, because of its frequent use herein, applicant will often abbreviate the term "hydrotalcite-like" with "HTL."

The methods by which HTL compounds have been made are found throughout the academic and the patent literature. For example, such methods have been reviewed by Reichle, "Synthesis of Anionic Clay Minerals (Mixed Metal Hydroxides, Hydrotalcite)," Solid States Ionics, 22 (1986), 135–141, and by Cavani et al., CATALYSIS TODAY, Vol. 11, No. 2, (1991). In the case of hydrotalcite-like compounds, the most commonly used production methods usually involve use of concentrated solutions of magnesium and aluminum which are often reacted with each other through use of strong reagents such as sodium hydroxide, and various acetates and carbonates. Such chemical reactions produce hydrotalcite or hydrotalcite-like compounds which are then filtered, washed, and dried. The resulting HTL compounds have been used in many ways—but their use as hydrocarbon cracking catalysts, sorbents, binder materials for catalysts and water softener agents is of particular relevance to this patent disclosure.

It also is well known that HTL compounds will decompose in a predictable manner upon heating and that, if the heating does not exceed certain hereinafter more fully discussed temperatures, the resulting decomposed materials can be rehydrated (and, optionally, resupplied with various anions, e.g., $CO_3^-$, that were driven off by the heating process) and thereby reproduce the original, or a very similar, HTL compound. The decomposition products of such heating are often referred to as "collapsed," or "metastable," hydrotalcite-like compounds. If, however, these collapsed or metastable materials are heated beyond certain temperatures (e.g., 900° C.), then the resulting decomposition products of such hydrotalcite-like compounds can no longer be rehydrated and, hence, are no longer capable of forming the original hydrotalcite-like compound.

Such thermal decomposition of hydrotalcite-like compounds has been carefully studied and fully described in the academic and patent literature. For example, Miyata, "Physico-Chemical Properties of Synthetic Hydrotalcites in Relation to Composition," Clays and Clay Minerals, Vol. 28, No. 1, 50–56 (1980), describes the temperature relationships and chemical identity of the thermal decomposition products of hydrotalcite in the face of a rising temperature regime in the following terms:

"It is of interest to know the form in which the Al occurs after thermal decomposition of the hydrotalcite structure. A sample with x=0.287, hydrothermally treated at 200° C. for 24 hr, was calcined at 300°–1000° C. in air for 2 hr. After calcination at 300° C., both hydrotalcite and MgO were detected by X-ray diffraction, but after calcination at 400°–800° C. only MgO could be detected. At 900° C. MgO, $MgAl_2O_4$, and a trace of $\gamma$-$Al_2O_3$ were detected." (emphasis added, for reasons to be explained in the ensuing portions of this patent disclosure)

Miyata then goes on to note that:

"The crystallite size was smaller than 50 Å when the sample was calcined below 800° C. This value was much smaller than that for MgO obtained from pure $Mg(OH)_2$. On calcination above 800° C., the crystallite size rapidly increased. The changes of the crystallite size and lattice parameter a have the same tendency. Consequently, Al substituting in MgO acts to inhibit crystal growth. If Al-containing MgO is reacted with water, it should first form hydrotalcite. Hydrotalcite calcined at 400–800° C. with x=0.287 was hydrated at 80° C. for 24 hr, and the products were examined by X-ray powder diffraction. According to Table 7, hydrotalcite was the only hydrated product detected in samples calcined at 400–700° C.

The lattice parameter a is the same as that of the original sample. The samples calcined at 800° C. also formed only hydrotalcite but their lattice parameters are larger than that of the original sample. According to FIG. 1, the molar ratio of this product is x=0.235. On the other hand, $Al_2O_3$ does not react with water under the above-mentioned conditions. Therefore, the results suggest that Al enters product MgO when hydrotalcite is calcined between 400 and 700° C." (emphasis added)

U.S. Pat. No. 5,459,118 ("the '118 patent") describes the character of the materials that result from progressively heating hydrotalcite-like compositions (HTlc's) in a passage running from col. 4, line 67 to col. 5, line 14. It reads as follows:

"The natural products of calcination or activation in inert gas of a HTlc is believed to be a spinel. In the range between the temperature at which HTlc decomposition commences (between 572° and 752° F.) (i.e., between 300° C. and 400° C.) and that of spinel formation (1652° F.) (i.e., at 900° C.), a series of metastable phases form, both crystalline and amorphous. Therefore, the surface area, pore volume, and structure depend on the temperature of calcination. Upon calcination, the crystal structure of DHT-4A is decomposed at about 660° F. (i.e., 349° C.) when water and carbon dioxide evolved from the structure, and a MgO•$Al_2O_3$ solid solution of formula 4.5 MgO•$Al_2O_3$ is formed. This solid solution is stable up to 1472° F. (i.e., 800° C.) MgO and $MgAl_2O_4$ are formed at about 652° F. (i.e., 900° C.). On the other hand, the solid solution calcined at less than 1472° F. (i.e., 800° C.) can be restored in the original structure by hydration." (The underlined portions of this passage have been added to convert ° F. to ° C. in order to more directly compare the teachings of this reference with other relevant references wherein temperatures are expressed in ° C., again such comparisons will be made in the next few paragraphs of this patent disclosure)

It might also be noted here that this quotation from the '118 patent is a precise statement of the temperatures at which certain hydrotalcite decomposition products are described (e.g., spinel, $MgAl_2O_4$, formation taking place at 900° C. when hydrotalcite is thermally decomposed). This more exact knowledge of the temperatures at which certain aspects of the decomposition of hydrotalcite take place, clarifies many other, more general, statements found in the literature concerning the temperatures at which certain decomposition products are formed (e.g., statements concerned with the temperature at which spinel, $MgAl_2O_4$, is formed from a hydrotalcite starting material). That is to say that many, more general, statements concerning the temperatures at which various hydrotalcite thermal decomposition products (e.g., spinel, $MgAl_2O_4$) are formed must be carefully interpreted. For example, in U.S. Pat. No. 4,889,615 ("the '615 patent") at col. 6, lines 36–43, we find the statement:

"Calcining the Mg/Al hydrotalcites at temperatures greater than 500° C., gives a mixture of MgO and $MgAl_2O_4$, a magnesium aluminate spinel, a material which has been reported to reduce FCC regenerator $SO_x$ emissions (see U.S. Pat. Nos. 4,469,589 (Yoo) and 4,472,267 (Yoo)). The activity of the dehydrated hydrotalcite is, however, significantly different than that observed for the spinel, MgO, or mixtures of both. No evidence of $MgAl381_2O_4$ (sic) is observed in the regenerated hydrotalcite indicating that the spinel is not the active component." (emphasis added)

Thus, in view of the previous, more precise, descriptions of the temperature of spinel formation (i.e., 900° C.) in the '118 patent, it seems that the more general expression "temperatures greater than 500° C." used in the '615 patent should not be taken to mean something like 501° C., but rather should be taken to mean 900° C., a temperature which is indeed "greater than 500° C." It also should be noted that the above-quoted passage recognizes that "spinel is not the active component" of the materials described in the '615. We note this point here because it is consistent with applicant's hereinafter described goal of not making spinel—so that applicant's heat treated, intermediate products can in fact be hydrated (or rehydrated) to form hydrotalcite-like compositions.

A similar general statement concerning spinel formation from a hydrotalcite precursor appears in U.S. Pat. No. 4,458,026. There (at col. 3, lines 54–56) we find the statement:

"Above 600° C. the resulting metal oxide mixture begins to sinter and lose surface area, pore volume, as well as form a catalytically inactive phase (spinel-$MgAl_2O_4$)." (emphasis added)

Here again, applicant is of the opinion that the general expression "Above 600° C." should not be taken to mean something like 601° C., but rather should be taken to mean far enough above 600° C. to form spinel—$MgAl_2O_4$ that is to say 900° C., the temperature at which spinel formation from a hydrotalcite-like compound has been more precisely determined. This quotation also notes that spinel is "catalytically inactive".

Indeed, one can even find generalized statements about the temperature of spinel formation that are better interpreted to mean lower temperature levels. For example, in U.S. Pat. No. 5,114,898 (at col. 4, lines 43–51) we find the statement:

"Reichle in J. Catal. 101, 352 to 359 (1986) has shown that this heating of hydrotalcite was accompanied by an increase in the surface area from about 120 to about 230 $m^2/g$ ($N_2$/BET) and a doubling of pore volume (0.6 to 1.0 $cm^3/g$, Hg intrusion). Further heating to higher temperatures causes lowering of surface area as well as reactivity. At 1000° C., the formation of MgO and the spinel phase, $MgAl_2O_4$ has been observed." (emphasis added)

In this case, applicant thinks that the statement "At 1000° C. the formation of MgO and spinel phase has been observed", is better taken to mean: spinel is observed at 1000° C. because spinel ($MgAl_2O_4$) forms at 900° C.—rather than taken to mean: 1000° C. is the temperature of formation of spinel. Indeed, applicant has by his own experimental work confirmed that spinel begins to from in HTL compounds at 900° C.

The prior art also has noted that when various anionic clay-forming ingredients such as hydrotalcite-forming ingredients (e.g., magnesium-containing compositions and aluminum-containing compositions) are mixed under certain prescribed conditions (e.g., certain aging times, pH conditions, temperatures, etc.), the resulting slurry or precipitate materials (e.g., hydrotalcite-like materials) will exhibit distinct catalytic properties. Hence, many such production processes are based upon fine tuning of such time, temperature, pH, etc. conditions in order to obtain maximum amounts of a given kind of hydrotalcite-like precipitate product.

The slurry and/or precipitate products of such initial chemical reactions also have been heat treated to obtain various "collapsed" or "metastable" hydrotalcite materials that have specific catalytic properties. Such collapsed materials have, for example, been used as sorbents (and especially $SO_x$ sorbents for fluid catalytic and fixed hydrocarbon cracking processes), hydrocarbon cracking catalysts, catalyst binders, anion exchangers, acid residue scavengers and stabilizers for polymers, and even as antacids intended for use in the context of human medicine.

The prior art also has long recognized that other ingredients such as compounds containing Ce, V, Fe and Pt can be added to the original hydrotalcite-forming reaction mixtures so they will appear as a distinct phase of various solid products created by such reactions. Dried forms of such anionic clays (e.g., microspheroidal particles of such hydrotalcite-like compounds used as $SO_x$ sorbents in fluid catalytic conversion (FCC) processes) also have been impregnated with solutions of such metals. Moreover, such metals have even been made a integral part of the crystalline structure of hydrotalcite-like materials (see, for example, U.S. Pat. No. 5,114,691 and U.S. Pat. No. 5,114,898 which teach use of sulfur oxidizing catalysts made of layered double hydroxide (LDH) sorbents, e.g., hydrotalcite-like materials that contain metal ions (e.g., those of vanadium) that replace some or all of the divalent metals ($Mg^{2+}$) or trivalent metals ($Al^{2+}$) that form the layers of the LDH).

Hydrotalcite-like compounds that are used as catalysts also have been both heat treated and associated with various catalyst binder or matrix materials. For example, U.S. Pat. No. 4,866,019 (the '019 patent) discloses that hydrotalcite can be heat treated and used in association with various binder materials. U.S. Pat. No. 5,153,156 teaches a method for making magnesium/aluminum synthetic anionic clay catalysts by (1) spray drying a slurry of a magnesium aluminum synthetic clay, (2) making a plasticized mixture of the spray dried clay with diatomaceous earth and (3) forming, drying and calcining the resulting plasticized mixture.

The prior art also has long recognized that anionic clay materials can be used to catalyze certain specific chemical reactions. For example, U.S. Pat. No. 4,458,026 teaches use of certain heat treated anionic clay materials as catalysts for converting acetone to mesityl oxide and isophorone. The anionic clays are given this catalytic activity by heating them to temperatures ranging from about 300 to 600° C.

U.S. Pat. No. 4,952,382 teaches a hydrocarbon conversion process that employs a catalyst composition containing an anionic clay wherein the anionic clay serves as a sulfur oxides binding material.

U.S. Pat. No. 4,970,191 teaches use of polymorphic magnesium-aluminum oxide compositions as catalysts in various base catalyzed reactions such as alcohol condensation, isomerization of olefins, etc.

U.S. Pat. No. 4,889,615 discloses a vanadium trap catalyst additive comprising a dehydrated magnesium-aluminum hydrotalcite.

U.S. Pat. No. 5,358,701 teaches the use of layered double hydroxide (LDH) sorbents such as hydrotalcite-like materials as $SO_2$ sorption agents. This reference postulates that the sulfur-containing gas absorbs into the hydrotalcite structure as $SO_3^{2-}$ anions by replacing the gallery $CO_3^{2-}$ anions. The absorbed sulfur is thereafter driven off by calcination at elevated temperatures (500° C.). The LDH sorbents are regenerated by hydrolyzing the calcined product, particularly in the presence of $CO_2$ or $CO_3^{2-}$.

U.S. Pat. No. 5,114,691 teaches removing sulfur oxide from gas streams using heated layered double hydroxide (LDH) sorbents having metal-containing: oxoanions incorporated into the galleries of the LDH structures.

U.S. Pat. No. 4,465,779 teaches catalytic cracking composition comprising a solid, cracking catalyst and a diluent containing a magnesium compound in combination with a heat-stable metal compound.

U.S. Pat. No. 5,426,083 teaches catalytic use of a collapsed composition of microcrystallites comprised of divalent metal ions, trivalent ions, vanadium, tungsten or molybdenum.

U.S. Pat. No. 5,399,329 teaches making hydrotalcite-like materials by preparing a mixture of magnesium (divalent cation) to aluminum (trivalent cation) in a molar ratio between 1:1 and 10:1, and in a mono carboxylic anion to aluminum (trivalent cation) molar ratio between 0.1:1 to 1.2:1. The process involves reacting a mixture comprising magnesium and aluminum cations and mono carboxylic anions in an aqueous slurry having a temperature of at least 40° C. and a pH of at least 7. Generally speaking, a given synthesis of a HTL compound by any of the methods taught in these patents was considered a success when the product of its chemical synthesis reaction (slurries typically were heated and/or pressured to form a final dry product or precipitate) produces a given HTL compound having an x-ray diffraction pattern which reasonably resembles that of a given card in the files of the International Center for Diffraction Data ("ICDD").

In summarizing the prior art, it might be said that most methods that have been employed to produce anionic clay compounds, and especially hydrotalcite-like, anionic clay compounds, usually involve precipitation or slurry drying of a hydrotalcite-like product, washing and, optionally, heat treatment of the resulting dried slurry, or precipitated, composition. Once made, these HTL compounds, or their thermal decomposition products, have been employed as catalysts (e.g., as vanadium passivators, SOX additives, aldol condensation catalysts, water softening agents, and even medicines).

SUMMARY OF THE INVENTION

Applicant's contribution to this art has been to discover certain hereinafter described methods, whereby HTL compounds can be produced from compounds that do not exhibit HTL structures (e.g., as determined by their XRD patterns), but which do exhibit HTL structures upon being activated by the processes of this patent disclosure. Applicant also has discovered certain novel methods whereby anionic clays in general and hydrotalcite-like compounds in particular can be given certain attributes (increased hardness, density, etc.) that make such compounds better suited for uses where these attributes are desirable, e.g., as sorbents for various chemical species—but especially $SO_x$ sorbents—and especially those $SO_x$ sorbents (and binder materials) used in FCC units, as hydrocarbon catalysts, as water softening agents, etc.

Again, those compounds generally described as "anionic clays" in the literature, and especially hydrotalcite, and HTL anionic clay compounds, will be collectively referred to as "HTL compounds" for the purposes of this patent disclosure. More specifically this invention involves formation of hydrotalcite-like compounds by certain novel production methods and the use of certain formed shapes (microspheroidal particles, extrudates, pellets) containing those hydrotalcite-like compounds produced by applicant's processing techniques. For example, these formed shapes (e.g., microspheroidal particles, pellets, extrudates, etc.) for certain specific catalytic uses (e.g., FCC operations, $SO_x$ sorption, water softener regeneration agents, etc.). Hence, the HTL compounds of this patent disclosure may constitute part of (or even all of) a given catalyst particle, pellet, extrudate, etc. By way of example the HTL compounds of this patent disclosure may be associated with various binder or matrix forming materials known to the catalyst making art. Indeed, the HTL compounds of this patent disclosure may be used as catalysts per se (e.g., as hydrocarbon cracking catalysts), as $SO_x$ binding agents, or as catalyst binder materials for other catalyst materials. Hence, for the purposes of this patent disclosure the term "catalyst" should be taken to mean not only those HTL compounds that have catalytic or $SO_x$ binding activity in their own right, but also those HTL compounds that are used as binders, matrices and/or carriers for other catalytically active compounds (e.g., binders for metallic, $SO_x$ oxidation catalysts such as compounds containing platinum, cerium and vanadium). These applications are all related to the fact that the HTL compounds produced by applicant's methods can, among other ways, be characterized by their resistance to mechanical stresses and, hence, by their ability to function in the severe environments associated with many chemical reactions.

Applicant's overall invention is primarily based upon a two step "activation" procedure that is generally comprised of heat treating and then hydrating certain hereinafter described hydrotalcite-producing, precursor compounds. This two step process may, in some cases, be augmented by an additional, but purely optional, heat treatment step (which may be referred to as Step 3 of applicant's process). These heat treated compounds may be thought of "collapsed" or "metastable," HTL compound-forming materials.

Applicant's invention has two general embodiments. The first embodiment is a method for producing HTL compounds (e.g., anionic clay compounds, hydrotalcite per se, and various hydrotalcite-like compounds) from compounds that do not possess the structural characteristics of HTL compounds. The manner by which this first embodiment of applicant's invention differs from prior art methods for making similar HTL compounds is that applicant's initial HTL synthesis is carried out using those ingredients and those reaction conditions which are such that they do not directly produce compounds having a HTL structure, but rather produce compounds that exhibit a HTL structure only after experiencing applicant's hereinafter described activation process. Hence, in the first embodiment of this invention, an actual XRD determination that the product of applicant's initial slurry or precipitation synthesis reaction does not produce a compound having an XRD pattern that reasonably resembles that of a compound having the proper ingredient atoms (e.g., those of magnesium, aluminum, oxygen and hydrogen in the case of HTL compounds) on file with the ICDD could be an optional step in applicant's overall process.

It also should be specially noted, however, that applicant's synthesis products may well include "amorphous" (non-crystalline) materials as well as non-HTL, crystalline phases—and combinations thereof. Indeed, the term "amorphous" as used herein could include (1) crystalline phases which have crystallite sizes below the detection limits of conventional x-ray diffraction techniques, (2) crystalline phases which have some significant degree of ordering, but which lack a crystalline diffraction pattern due to dehydration or dehydroxilization (such as in layered aluminosilicates), and (3) true amorphous materials which may exhibit short range order, but no longrange order, such as, for example, silica and borate glasses.

Whatever their physical form (crystalline or amorphous), these precursor, synthesis reaction products may be subjected to some form of "low temperature" (i.e., "low temperature" may be taken to mean less than about 250° C., for the purposes of this patent disclosure) drying process before they undergo the heat treatment aspect of applicant's activation process. Such a low temperature drying process also may include the physical formation of those powders, pellets, beads, extrudates, microspheroidal spheres or granule forms of these reaction product materials that may be required (or desired) for use of these materials as catalysts, sorbents, ion exchange agents, etc. This drying step should, however, be considered "optional" because the most fundamental version of the first embodiment of applicant's invention could go directly to its heat treatment step.

This heat treatment step involves heating applicant's synthesis reaction products to a "medium temperature" (i.e., a temperature in the range of about 300° C. to about 850° C.). This heat treatment may be carried out for widely varying periods of time (e.g., from for about 0.1 to about 24.0 hours. This 300° C.–850° C. heat treatment step may generally be referred to as Step 1 of applicant's overall "activation" process. It is more preferred, however, that Step 1 be conducted at a temperature on the low-end of this 300° C.–850° C. range. This treatment may be carried out at some preferred temperature (e.g., 450° C.) or at different temperatures in this 300° C. to 850° C. range. Step 1, medium temperature, heat treatments in the range of about 400° C. to about 500° C. are, however, highly preferred. Temperatures at the upper end of applicant's 300°–850° C. range, such as temperatures ranging from about 700°–850° C., are less preferred since various less desirable phases (hereinafter more fully described) may result from heating applicant's precursor, synthesis reaction products to such levels. The formation of these less desirable phases may diminish the precursor material's potential to form maximum amounts of the HTL-containing phases that are the object of applicant's processes.

These higher temperatures also are less preferred because they come dangerously close to the 900° C. temperature at which a particularly undesirable material—namely, spinel ($MgAl_2O_4$) begins to form. Again, applicant regards spinel formation as "anathema" to this process because spinel can not be rehydrated. This is not to say however that any other material, e.g., MgO, that be present in such a system at temperatures at or above 900° C., can not be employed for applicant's purposes. For example, if applicant's hydrotalcite-like starting material is converted into spinel ($MgAl_2O_4$) it becomes useless for applicant's purposes; if, however, applicant's starting material is converted into MgO, it still may be useful (e.g., as an $SO_x$ sorbent agent).

In any event, temperatures of 900° C. or higher can be regarded as "high temperatures" for the purpose of this patent disclosure and they are to be avoided as far as possible. This admonition also is consistent with the teachings and spirit of the literature. That is to say that nowhere does the literature even remotely suggests that spinel can be reversibly hydrated into any other phase at ambient temperatures. By way of sharp contrast with this, the literature teaches that HTL compounds such as applicant's, very decidedly possess the characteristic of rehydratability.

The literature also teaches that the basic structural building block of HTL, the brucite structure, $Mg(OH)_2$, also possess this "rehydratability" characteristic. It is also known that, if the crystal size of such materials grows significantly (as it does with increasingly higher thermal treatment temperatures), then such "reversibility" is eventually lost. Consequently, the brucite layer no longer forms upon rehydration. This is the same situation applicant expected, and in fact observed, for various HTL compounds made by the teachings of this patent disclosure. Indeed, applicant found that as temperature increases beyond certain levels, an increase in a MgO-like material's crystallite size, as well as alumina and magnesium aluminate (spinel) formation, eventually do take place. Consequently, for maximum $SO_x$ activity of applicant's HTL compounds, it is preferred that all the MgO in a given system remain with the HTL phase as opposed to reacting with other phases and thereby rendering the MgO "inactive" e.g., inactive as a $SO_x$ "pickup agent." Again, this is best achieved by not using temperatures above about 850° C.

In any case, the heat treated product of Step 1 of applicant's "activation" process is then subjected to a hydration step. This hydration step might be termed Step 2 of applicant's activation procedure. It generally entails mixing the heat treated product of Step 1 with a quantity of moisture which is such that heat is evolved from the heat treated precursor material/liquid (e.g., water) mixture. The method or manner of hydration to effect applicant's Step 2 will include, but not limited to such methods as spraying, impregnating and blunging.

In any case, the heat release produced by this hydration is indicative of the heat of formation of a HTL compound. Additionally, this heat release signifies the occurrence of the chemical reaction which is presumed to be the cause of the greatly improved physical properties of HTL compounds prepared by the methods of this patent disclosure. It also should be noted here that in order to maximize the amount of HTL compound produced by this hydration step, the amount of water added should be substantial in quantity (on the order of 30–50 weight percent of the dry, precursor material). Such amounts of water are required in order to fully form HTL phases although less water will still result in a material that exhibits a HTL phase; such a phase will not, however, be "pure," i.e., other collapsed HTL phases will be present (i.e., a MgO-like phase and/or a MgAl solid solution phase).

Again, depending on the hydration method to be employed, the previously noted "low temperature," optional drying step also may be employed in order to render a material having a desired amount of physical water. And, once again, this low temperature drying should not exceed about 250° C. because applicant has found that temperatures in excess of this may result in a premature release of various interlayer ions, water, crystalline water, or certain carbonates. In any case, the HTL compound product produced by applicant's hydration step will possess a crystalline structure which exhibits an x-ray diffraction pattern that may, and probably will, reasonably resemble a ICDD "card" for some HTL compound that has a similar crystalline structure.

In some cases this hydrated product may again be "collapsed" by a second heat treatment step which might be called Step 3 of applicant's process (e.g., Step 3 heat treatments at temperatures ranging from about 300° C. to 850° C. and preferably at 400° C. to 500° C.) in order to remove its interstitial water so that the resulting material is better suited to certain uses such as a $SO_x$ sorbent in a FCC unit. Compounds created by this third step may be used for any of the purposes for which the HTL compounds created by applicant's Step 1 and Step 2 materials may be used.

From a broad conceptual point of view, the most fundamental version of the first embodiment of applicant's invention might be thought of as being based upon: (1) a "delay" in the production of a hydrotalcite-like compound end product relative to the point at which analogous hydrotalcite-like compounds have been made by prior art production methods, (2) heat treatment (single stage or multiple stage) of these "not yet" (e.g., with this "not yet" quality or state being determined by XRD methods) hydrotalcite-like materials and (3) hydration of the these heat treated materials to form hydrotalcite-like compounds. Stated another way, it might be said that the goal of applicant's initial synthesis or chemical reaction step is to not make as much of a subject, end product, HTL compound as possible (e.g., not to make as much hydrotalcite as possible), but rather to make as little of the desired end product compound, (e.g., to make as little hydrotalcite) as possible.

In any event, applicant's first general process may generally employ any combination of those HTL compound creating starting ingredients (e.g., magnesium-containing compounds having less reactive anions and aluminum-containing compounds having less reactive anions) and any of those reaction conditions (e.g., short reaction aging times, neutral pH levels, and ambient temperatures reaction conditions) that may serve to—and, indeed, strive to—produce a resulting slurry or precipitate material that does not exhibit the crystalline structure of the HTL compound that ultimately will be exhibited by applicant's end product hydrotalcite-like compound. In fact, the precursor compounds obtained by the initial chemical reaction step of applicant's first process may well be entirely amorphous materials having no HTL structure whatsoever.

In the second embodiment of applicant's invention, however, a hydrotalcite-like compound is purposely used as the starting material, or as a precursor compound. That is to say that a hydrotalcite-like starting material can be purchased commercially—or it can be synthesized by use of any of the many methods known to this art and then be employed according to the teachings of this patent disclosure. In either case, however, applicant's process calls for heat treatment of the hydrotalcite-like compound (however obtained) to form a "collapsed" or "metastable" material. This heat treatment also may be thought of as Step 1 of this second embodiment of applicant's invention. The collapsed or metastable material of this second embodiment is then hydrated to again form a hydrotalcite-like compound. This hydration may be thought of as Step 2 of this second embodiment of applicant's invention. Applicant has found that this "roundabout" method of producing a hydrotalcite-like compound (from a hydrotalcite-like compound) is well worth the extra effort because the resulting hydrotalcite-like compound will be harder and/or more dense than the original hydrotalcite-like compound from which the resulting HTL compound was made.

Stated another way, the starting ingredient in the second embodiment of applicant's invention already will be a rehydratable hydrotalcite-like compound. This may be evidenced, for example, by the fact that it already generally displays XRD peaks that resemble those of a known HTL compound having the same ingredients (e.g., Mg and Al). In any case, this hydrotalcite-like compound starting material is then heat treated to convert it into a "collapsed" or "metastable" compound such as those described in the Miyata reference, or in the '118 patent. The Step 2, heat treatment of the second embodiment of this invention can be conducted at a single preferred temperature (e.g., 450° C.) or at two or more distinct temperatures in the general temperature range of 300° C. to 850° C., e.g., at a first, lower temperature, (e.g., at 300° C.) followed by a second temperature heat treatment (e.g., at 400° C. to 500° C.). Here again, however, temperatures greater than about 850° C. are to be avoided in this second embodiment of applicant's process for the same reasons they were to be avoided in the first embodiment. For example, if the original synthesis compound were hydrotalcite, and it experienced a 900° C. heat treatment temperature for any significant period of time in the second embodiment of applicant's invention, it too would in fact be converted it into spinel ($MgAl_2O_4$) and, thus, would be rendered useless for the purposes of practicing this invention. Here again, any hydrotalcite converted to MgO by such high temperatures would, however, still be potentially useful in carrying out functions for applicant's end product materials.

In any case, after the hydrotalcite-like compound of this second embodiment is heat treated to an extent that it takes on a "collapsed" or "metastable" form, it can then hydrated (e.g., in a water system at 20–100° C. for at least 0.1 hours) in the same manner employed in the first embodiment of this invention to again form a similar hydrotalcite-like compound. Again, this "hydrotalcite-like compound—to hydrotalcite-like compound" production process is not a useless, redundant or roundabout journey because the hydrotalcite-like compounds resulting from this second embodiment of applicant's invention will, in fact, have certain improved physical and/or chemical properties (e.g., greater density, attrition resistance, catalytic activity, etc.) relative to those comparable properties possessed by the original hydrotalcite-like compound from which the resulting or end product hydrotalcite-like compound was derived. And as in the case of the first embodiment of this invention, the resulting HTL compound of this second embodiment can be once again heat treated (this may be thought of as Step 3 of this second embodiment) at temperatures ranging from about 300° C. to 850° C. in order to obtain a yet harder material whose loss of water due to this second heat treatment may render the resulting material better suited to certain uses (e.g., as a $SO_x$ absorbent in a FCC unit). That is to say that Step 3 can be employed to give the resulting material (here again, a "collapsed" or "metastable" HTL compound-forming material) improved physical properties relative to those HTL compounds that are not subjected to this additional heat treatment process.

The anionic compounds that can be produced by the hereindescribed processes will most preferably have a chemical structure:

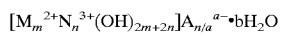

$$[M_m^{2+}N_n^{3+}(OH)_{2m+2n}]A_{n/a}{}^{a-}\cdot bH_2O$$

wherein $M^{2+}$ and $N^{3+}$ are cations, m and n are selected such that the ratio of m/n is about 1 to about 10, a will have a value of 1, 2 or 3, A is an anion with charge of —1, —2 or —3, and b will range between 0 and 10, are highly preferred. The most preferred elements for "M" in the above structure will be Mg, Ca, Zn, Mn, Co, Ni, Sr. Ba, Fe and Cu . The most preferred element for "N" will be Al, Mn, Fe, Co, Ni, Cr, Ga, B, La and Ce. The most preferred elements for "A" with charge a—will be $CO_3^{2-}$, $NO_3^-$, $SO_4^{2-}$, $Cl^-$ and $OH^-$, $Cr^-$, $I^-$, $SO_4^{2-}$, $SiO_3^{2-}$, $HPO_3^{2-}$, $MnO_4^{2-}$, $HGaO_3^{2-}$, $HVO_4^{2-}$. $ClO_4^-$ and $BO_3^{2-}$ and mixtures thereof.

Applicant generally has found that HTL compounds made by either of the two general embodiments of this invention are usually at least about 10% harder and/or 10% more dense than comparable HTL compounds made from the same ingredients by prior art production methods. These physical attribute(s), e.g., of hardness and/or greater density, makes those catalysts, sorbents, catalyst binders and ion exchange agents (e.g., water softener agents) made from applicant's hydrotalcite-like compounds more attrition resistant —and hence longer lasting—especially in a fluid catalytic converter ("FCC") environment. Applicant's resulting compounds also have an improved ability to be regenerated (e.g., with respect to their ability to continue to serve as $SO_x$ sorbents, hydrocarbon cracking (or hydrocarbon forming) catalysts, ion exchange agents, etc.) after having experienced temperatures which would permanently deactivate analogous anionic clays (such as analogous hydrotalcite-like compounds) made by prior art manufacturing methods. Indeed, these improved physical attributes can be thought of as even further helping to define applicant's materials and distinguish them from analogus HTL compounds made by prior art methods. That is to say that, if applicant's "activation" procedures (using Steps 1 and 2 or using Steps 1, 2 and 3) produce, say, a hydrotalcite-like compound exhibiting greater hardness and/or greater density than a comparable hydrotalcite-like compound made by other methods, then these qualities may help to distinguish applicant's "hydrotalcite-like compounds" from those made by prior art methods.

There are several general embodiments of applicant's processes for making and using the HTL compounds of this patent disclosure. The differences between them generally revolve around: (1) whether or not the material produced by the original synthesis reaction is a non-anionic clay compound (e.g., a non-hydrotalcite-like compound) or an anionic clay compound (e.g., a hydrotalcite-like compound), (2) whether or not the non-anionic clay compound or the anionic clay compound is dried and heat treated in one or more stages before it is eventually hydrated and (3) whether or not the resulting HTL compound is used as a catalyst (or catalyst binder), a $SO_x$ sorbent, an ion exchange agent, etc. Some of these embodiments may be expressed as follows:

1. A process for making an anionic clay compound, said process comprising:
   (1) preparing a reaction mixture comprising a divalent metal-containing compound and a trivalent metal-containing compound under conditions such that a product obtained from the reaction mixture is a non-anionic clay compound;
   (2) heat treating the non-anionic clay compound to create a heat treated, non-anionic clay compound;
   (3) hydrating the heat treated, non-anionic clay compound to obtain an anionic clay compound.

2. A process for making an anionic clay compound, said process comprising:
   (1) preparing a reaction mixture comprising a divalent metal-containing compound and a trivalent metal-containing compound under conditions such that a product obtained from the reaction mixture is a non-anionic clay compound;
   (2) low temperature treating the non-anionic clay compound to obtain a low temperature treated, non-anionic clay compound;
   (3) medium temperature treating the non-anionic clay compound to create a precursor for an anionic clay compound;
   (4) hydrating the precursor for an anionic clay compound to obtain an anionic clay compound.

3. A process for making an anionic clay compound, said process comprising:
   (1) preparing a reaction mixture comprising a divalent metal-containing compound and a trivalent metal-containing compound under conditions such that a product obtained from the reaction mixture is a non-anionic clay compound;
   (2) converting the non-anionic clay compound into a desired physical form;
   (3) heat treating the non-anionic clay compound to obtain a collapsed, heat treated, non-anionic clay compound;
   (4) hydrating the collapsed, heat treated, non-anionic clay compound to obtain an anionic clay compound.

4. A process for making a hydrotalcite-like compound, said process comprising:
   (1) preparing a reaction mixture comprising an aluminum-containing compound and a magnesium-containing compound under conditions such that a product obtained from the reaction mixture is a non-hydrotalcite-like compound;
   (2) heat treating the non-hydrotalcite-like compound to create a heat treated, non-hydrotalcite-like compound;
   (3) hydrating the heat treated, non-hydrotalcite-like compound to obtain a hydrotalcite-like compound.

5. A process for making a hydrotalcite-like compound, said process comprising:
   (1) preparing a reaction mixture comprising an aluminum-containing compound and a magnesium-containing compound under conditions such that a product obtained from the reaction mixture is a non-hydrotalcite-like compound;
   (2) low temperature treating the non-hydrotalcite-like compound to obtain a low temperature treated, non-hydrotalcite-like compound;
   (3) medium temperature treating the non-hydrotalcite-like compound to create a precursor for a hydrotalcite-like compound;
   (4) hydrating the precursor for a hydrotalcite-like compound to obtain a hydrotalcite-like compound.

6. A process for making a hydrotalcite-like compound, said process comprising:
   (1) preparing a reaction mixture comprising an aluminum-containing compound and a magnesium-containing compound under conditions such that a product obtained from the reaction mixture is a non-hydrotalcite-like compound;
   (2) converting the non-hydrotalcite-like compound into a desired physical form;
   (3) heat treating the non-hydrotalcite-like compound to obtain a collapsed, heat treated, non-hydrotalcite-like compound;
   (4) hydrating the collapsed, heat treated, non-hydrotalcite-like compound to obtain a hydrotalcite-like compound.

7. A process for making a relatively hard, hydrotalcite-like catalyst, said process comprising:
   (1) preparing a reaction mixture comprising an aluminum-containing material and a magnesium-containing compound under conditions such that a product obtained from the reaction mixture is a relatively soft, hydrotalcite-like compound;
   (2) converting the relatively soft, hydrotalcite-like compound into a form suitable for use as a catalyst;
   (3) heat treating the relatively soft, hydrotalcite-like compound to obtain a heat treated, precursor for a relatively hard, hydrotalcite-like catalyst; and
   (4) hydrating the heat treated, precursor for a relatively hard, hydrotalcite-like catalyst to obtain a relatively hard, hydrotalcite-like catalyst.

8. A process for making a relatively hard, hydrotalcite-like catalyst, said process comprising:
   (1) preparing a reaction mixture comprising an aluminum-containing compound and a magnesium-containing compound under conditions such that a product obtained from the reaction mixture is a relatively soft, hydrotalcite-like compound;
   (2) converting the relatively soft, hydrotalcite-like compound into a form suitable for use as a catalyst;
   (3) low temperature treating the relatively soft, hydrotalcite-like compound to obtain a low temperature treated, relatively soft, hydrotalcite-like compound;
   (4) medium temperature treating the relatively soft, hydrotalcite-like compound to create a precursor for a relatively hard, hydrotalcite-like catalyst; and
   (5) hydrating the precursor for a relatively hard, hydrotalcite-like catalyst to obtain a relatively hard, hydrotalcite-like catalyst.

9. A process for making a relatively hard, hydrotalcite-like $SO_x$ sorbent, said process comprising:
   (1) preparing a reaction mixture comprising an aluminum-containing compound and a magnesium-containing compound under conditions such that a product obtained from the reaction mixture is a relatively soft, hydrotalcite-like compound;
   (2) converting the relatively soft, hydrotalcite-like compound into a physical form suitable for use as a $SO_x$ sorbent;
   (3) heat treating the relatively soft, hydrotalcite-like compound to obtain a precursor for a relatively hard, hydrotalcite-like $SO_x$ sorbent; and (4) hydrating the precursor for a relatively hard, hydrotalcite-like $SO_x$ sorbent to obtain a relatively hard, hydrotalcite-like $SO_x$ sorbent.

Because the HTL compounds of this patent disclosure are harder than HTL compounds made by prior art processes, they present a method whereby the useful life of a catalyst or sorbent system (such as those employed in FCC units or fixed bed units) can be extended. This extension of a catalyst's (or sorbent's) useful life will take place when the HTL compounds of this patent disclosure are used in their own right, e.g., as hydrocarbon cracking or forming catalysts, $SO_x$ sorbents, etc., or when these HTL compounds are used as binders, matrices, supports, or carriers for other catalytically active materials (e.g., when they are used as binders for $SO_2 \rightarrow SO_3$ oxidant metals).

Thus, using $SO_x$ sorption in a FCC unit used to refine petroleum as an example, the method of extending the useful life of an $SO_x$ sorbent (or catalyst) may be expressed in patent claim language in the following manner:

A method for extending the useful life of a $SO_x$ sorbent system used in a FCC unit being employed to refine a petroleum feedstock, said method comprising: employing a HTL compound made by use of a process of this patent disclosure as a $SO_x$ sorbent system in the FCC unit and wherein the HTL compound is in the form of a microspheroidal particle species whose primary function is sorbing $SO_x$ produced by refining a sulfur-containing petroleum.

Such a HTL compound-containing particle species may further comprise a binder agent selected group consisting of magnesium aluminate, hydrous magnesium silicate, magnesium calcium silicate, calcium silicate, alumina, calcium oxide and calcium aluminate.

Expressed in patent claim language, such a method for extending the useful life of a $SO_x$ additive system comprised of a $SO_2 \rightarrow SO_3$ oxidation catalyst and a $SO_3$ sorbent may comprise:

(1) employing the $SO_x$ additive system in the form of at least two physically distinct particle species wherein a first particle species contains the $SO_2 \rightarrow SO_3$ oxidation catalyst component and carries out a primary function of oxidizing sulfur dioxide to sulfur trioxide and the second particle species is physically separate and distinct from the first particle species and carries out a primary function of sorbing the $SO_3$ produced by the $SO_2 \rightarrow SO_3$ oxidation catalyst;

(2) employing the $SO_2 \rightarrow SO_3$ oxidation catalyst in the form of a particle species that comprises: (a) a sulfur $SO_2 \rightarrow SO_3$ oxidation catalyst comprised of a metal selected from the group consisting of cerium, vanadium, platinum, palladium, rhodium, molybdenum, tungsten, copper, chromium, nickel, iridium, manganese, cobalt, iron, ytterbium, and uranium; and (b) a binder made from a material selected from the group of metal-containing compounds consisting of hydrotalcite-like compounds, calcium aluminate, aluminum silicate, aluminum titanate, zinc titanate, aluminum zirconate, magnesium aluminate, alumina ($Al_2O_3$), aluminum hydroxide, an aluminum-containing metal oxide compound (other than alumina ($Al_2O_3$)), clay, zirconia, titania, silica, clay and clay/phosphate material; and (3) using the $SO_3$ absorbent component in the form of a second particle that comprises a hydrotalcite-like compound made by use of an "activation process" of this patent disclosure.

This activation process may involve use of Step 1 and Step 2 (or Steps 1, 2 and 3) upon a non-hydrotalcite-like starting material or a hydrotalcite-like starting material. Any of the HTL compounds may be used in FCC systems wherein the $SO_x$ sorbent particle species comprises from about 10 to about 90 weight percent of the overall $SO_x$ additive system (i.e., the $SO_x$ sorbent particle species and the $SO_2 \rightarrow SO_3$ oxidant particle species). Such an overall, $SO_x$ additive system will, in turn, normally comprise from about 0.5 to about 10.0 weight percent of a bulk hydrocarbon cracking catalyst (e.g., zeolite) $SO_x$ additive system.

Next, it should be understood that the HTL compounds made by any of these methods may be used in any way that the prior art has used hydrotalcite-like compounds made by any prior art method (e.g., they may be used as sorbents and especially $SO_x$ sorbents, hydrocarbon cracking catalysts, e.g., for use in fixed bed or fluid bed systems, catalyst carrier or binder materials, anion exchangers (e.g., water softener agents, etc.) acid residue scavengers, stabilizers for polymers, medicines, etc.). Applicant's HTL compounds are, however, particularly useful where the attributes of physical hardness, toughness, or greater density are especially desired (e.g., when they are used in FCC units as $SO_x$ sorbents, catalysts and catalyst binders or carriers).

BRIEF DESCRIPTION OF THE DRAWINGS

FIG. 11 shows XRD for a 3Mg/1Al/oxidant (Ce, V) system where the oxidants were added to the precursor slurry after a one hour, 732° C. calcination and wherein the oxidants were added to a precursor slurry.

FIG. 12 shows XRD for a 3Mg/1Al oxidant (Ce, V) system wherein the oxidants were added to a precursor slurry and wherein the system was activated through use of applicant's methods at 732° C.

DETAILED DESCRIPTION OF THE INVENTION

Figure 1:
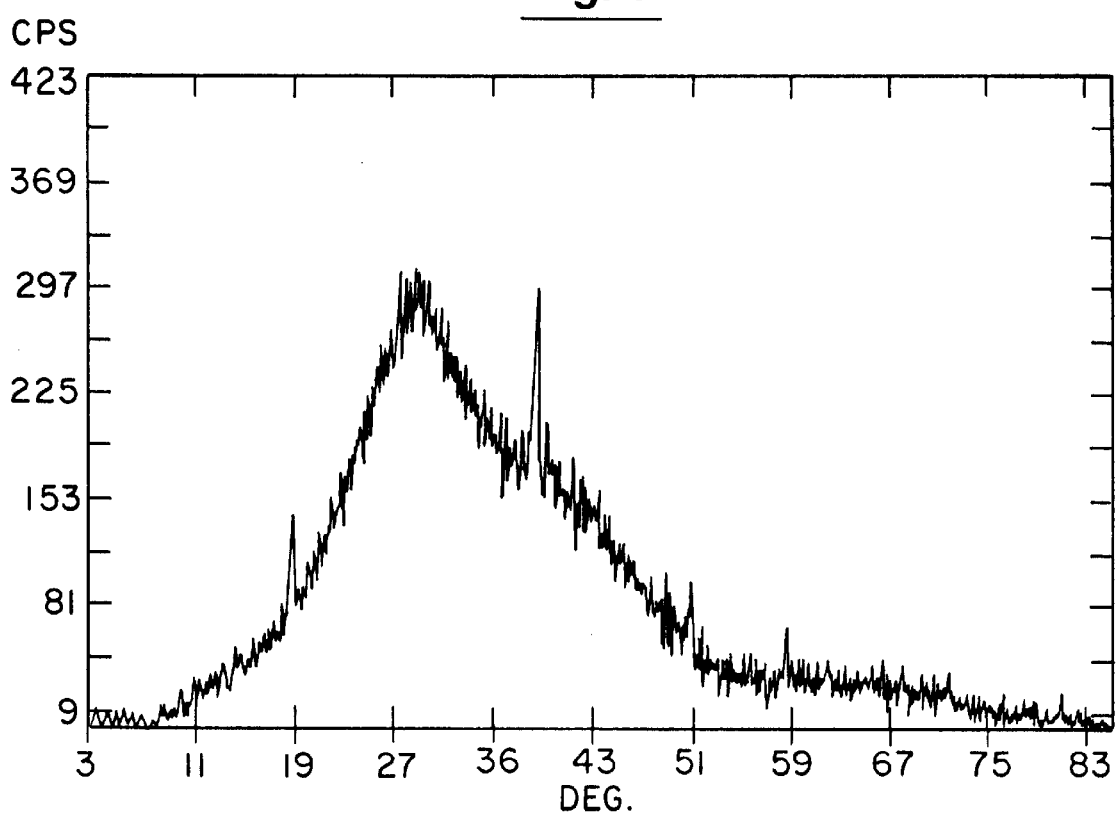
FIG. 1 is a XRD pattern for a 2Mg/1Al ratio HTL precursor slurry.

Even though this invention is broadly concerned with anionic clays in general, it is mostly illustrated through discussions, data and working examples that focus on those anionic clays known as hydrotalcite-like ("HTL") compounds. Applicant does this because (1) HTL compounds are perhaps the most readily formulated anionic clay compounds, (2) they are the most well studied and reported anionic clay compounds in the literature and because (3) they are, in fact, the most preferred compounds for actual practice of applicant's invention. The crystalline structures of some of the more preferred forms of HTL compounds for the practice of this invention reasonably resemble those of: (1) magnesium aluminum hydroxides, (2) magnesium aluminum hydroxide hydrates and (3) magnesium aluminum hydroxide carbonate hydrates. They are preferably made from compositions primarily comprised of (1) a magnesium-containing compound and (2) an aluminum-containing compound (e.g., an alumina sol, alumina gels or crystalline alumina) and, optionally, (3) other ingredients such as metal oxidants and binder materials commonly used to make certain end product forms of such HTL compounds (FCC catalysts, $SO_x$ sorbents, anion exchange pellets, etc.).

Some particularly useful magnesium-based compounds for creating applicant's HTL compounds will include magnesium hydroxy acetate, magnesium acetate, magnesium hydroxide, magnesium nitrate, magnesium hydroxide, magnesium carbonate, magnesium formate, magnesium chloride, magnesium aluminate, hydrous magnesium silicate and magnesium calcium silicate.

Some particularly useful aluminum-based compounds for creating applicant's HTL compounds will include aluminum acetate, aluminum nitrate, aluminum hydroxide, aluminum carbonate, aluminum formate, aluminum chloride, hydrous aluminum silicate and aluminum calcium silicate. In the case of the first embodiment of this invention, these magnesium-containing compounds and aluminum-containing compounds should be employed such that the product of their initial reaction does not produce the HTL compound that will ultimately be produced by applicant's invention. By way of example only, HTL compound formation by this initial reaction can be thwarted at this point in the production process by employing any synthesis-influencing factor selected from the group consisting of (1) use of less reactive magnesium-containing and/or less reactive aluminum-containing compounds (e.g., use of hydroxides instead of acetate forms of magnesium), (2) use of particulate ingredients rather than those in true solution, (3) use of relatively short reaction periods (e.g., less than 0.1 hours), (4) use of "neutral" pH levels (e.g., 6–8 pH levels) and (5) use of relatively low temperature reaction conditions (e.g., less than 30° C.).

Additionally, for use in those applications where other functions (e.g., oxidation of $SO_2 \rightarrow SO_3$) is a part of the proposed end usage of applicant's HTL compounds (e.g., when they are to be used as FCC catalyst, or $SO_x$ sorbent particles), any number of well known oxidants may be employed in conjunction with applicant's HTL compounds. Such oxidants would include, for example, platinum, those compounds which form oxides of the rare earth metals, oxides of transition metals, etc. Such oxidants can also be associated with the HTL compounds of this patent disclosure by impregnating dried forms of these HTL compounds with solutions containing ions of such oxidant metals.

Ingredient Proportions

TABLE I illustrates some representative relative concentrations of several HTL compositions that can be made by the teachings of this patent disclosure that are especially useful as $SO_x$ sorbent formulations. They are given in Table I, on a dry oxide basis, both with and without oxidants.

TABLE I

| Mg/Al (molar) (ratio) | 2/1 | 3/1 | 5/1 |
|---|---|---|---|
| MgO, w % | 61.3 | 70.4 | 79.8 |
| $Al_2O_3$, w % | 38.7 | 29.6 | 20.2 |
| MgO, w % | 52.1 | 59.8 | 67.8 |
| $Al_2O_3$, w % | 32.9 | 25.2 | 17.2 |
| $CeO_2$, w % | 12.0 | 12.0 | 12.0 |
| $V_2O_5$, w % | 3.0 | 3.0 | 3.0 |

It also should be appreciated that the HTL compounds of this patent disclosure can be used alone (that is to say that they can act catalytically, as sorbents, etc. and serve as their own binder or matrix material) or they can be associated with various catalyst binder or matrix-forming materials that are well known to those skilled in the catalyst and/or sorbent making arts. Indeed, such binder or matrix-forming materials may constitute up to about 99 weight percent of an overall catalyst or sorbent material (be it a microspheroidal particle, pellet, extrudate, etc.) in which the HTL compounds of this patent disclosure are employed. By way of example only, such catalyst, $SO_x$ binder or matrix-forming materials may be magnesia, alumina, aluminum-containing metal oxide compounds, aluminum hydroxide, clay, zirconia, titania, silica, clay and/or clay/phosphate materials.

This all goes to say that, even thought the HTL compounds of this patent disclosure may serve as both an SO sorbent and as its own binder material in the practice of this invention, applicant's SO sorbent catalysts (as well as any other solid forms of these HTL compounds) may, more preferably, comprise at least one HTL compound made by the processes of this invention and at least one, chemically different, binder, matrix, support, etc. material for that HTL compound. For example, a $SO_x$ additive catalyst intended for use in a FCC unit may be comprised of a hydrotalcite-like compound supported by, say, a calcium aluminate binder.

Next it should be again noted that when applicant's HTL compounds are used as SO sorbent components, or catalysts or anion exchange agents, etc., they may be so used alone—e.g., as separate and distinct SO sorbent particles or they may be used with other active materials which may be present as different particle species or as components of the particle species that employ the HTL compounds of this patent disclosure. By way of example only, such particles may be provided with their own $SO_2 \rightarrow SO_3$ oxidation catalyst ingredient(s). Moreover, one or more particle species that make up applicant's SO sorbent component(s) may be—as an option, and not a requirement-provided with $SO_2 \rightarrow SO_3$ oxidation catalysts selected from the group consisting of cerium, vanadium, platinum, palladium, rhodium, iridium, molybdenum, tungsten, copper, chromium, nickel, manganese, cobalt, iron, ytterbium, and uranium. Of these possible $SO_2 \rightarrow SO_3$ oxidation catalysts, ceria and vanadia have proven to be a particularly effective $SO_2$ oxidation catalyst when an $SO_2$ oxidant is used in conjunction with applicant's HTL compound based, $SO_3$ absorbents. It also should be understood, however, that $SO_2 \rightarrow SO_3$ oxidation catalysts of this kind also could be placed upon an entirely separate and distinct particle species that is admixed with those particles that are made with applicant's HTL compounds.

Preparation and Processing

Figure 2:
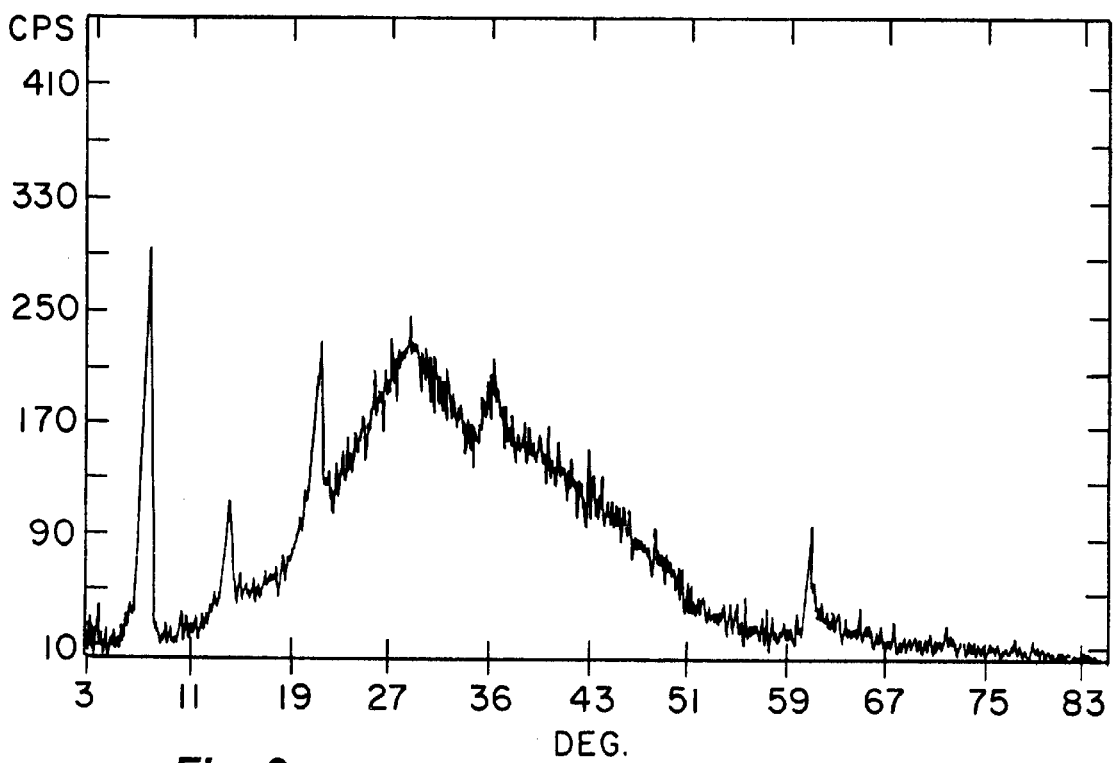
FIG. 2 is a XRD pattern for a 2Mg/1Al ratio HTL precursor slurry in which the slurry has been heat aged at about 80–85° C.
Figure 3:
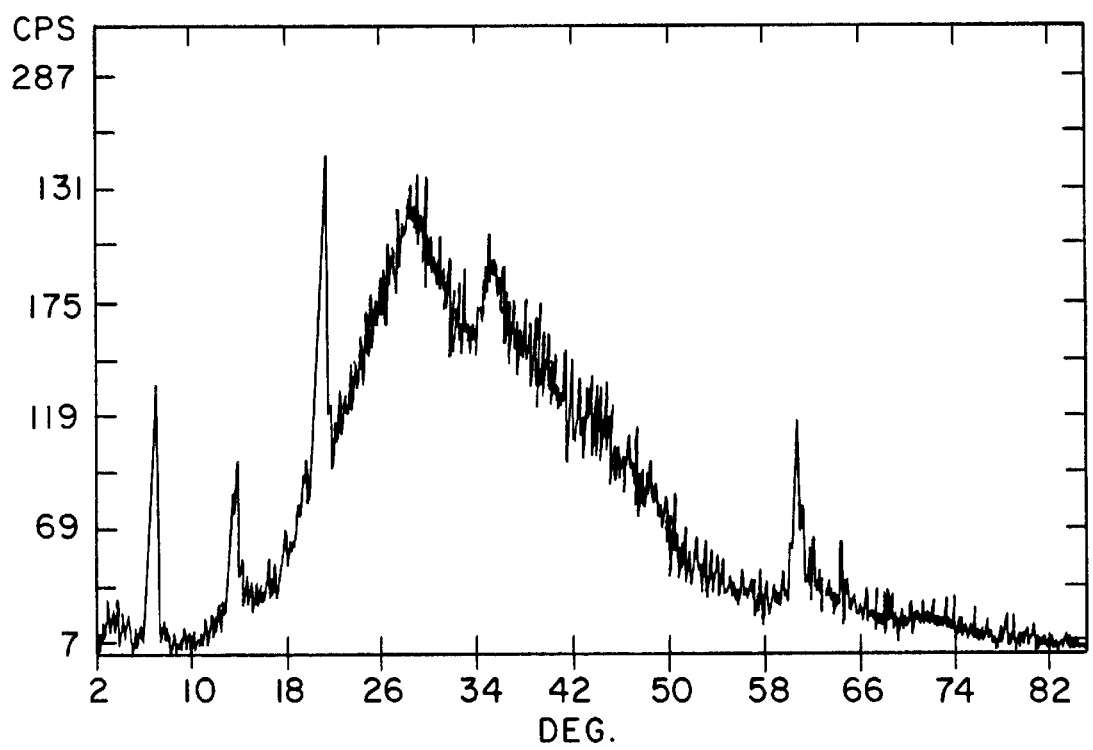
FIG. 3 is a XRD pattern for a 2Mg/1Al ratio HTL precursor slurry in which the slurry has been heat aged at about 80–85° C. for a longer duration than the material whose XRD is depicted in FIG. 2.
Figure 4:
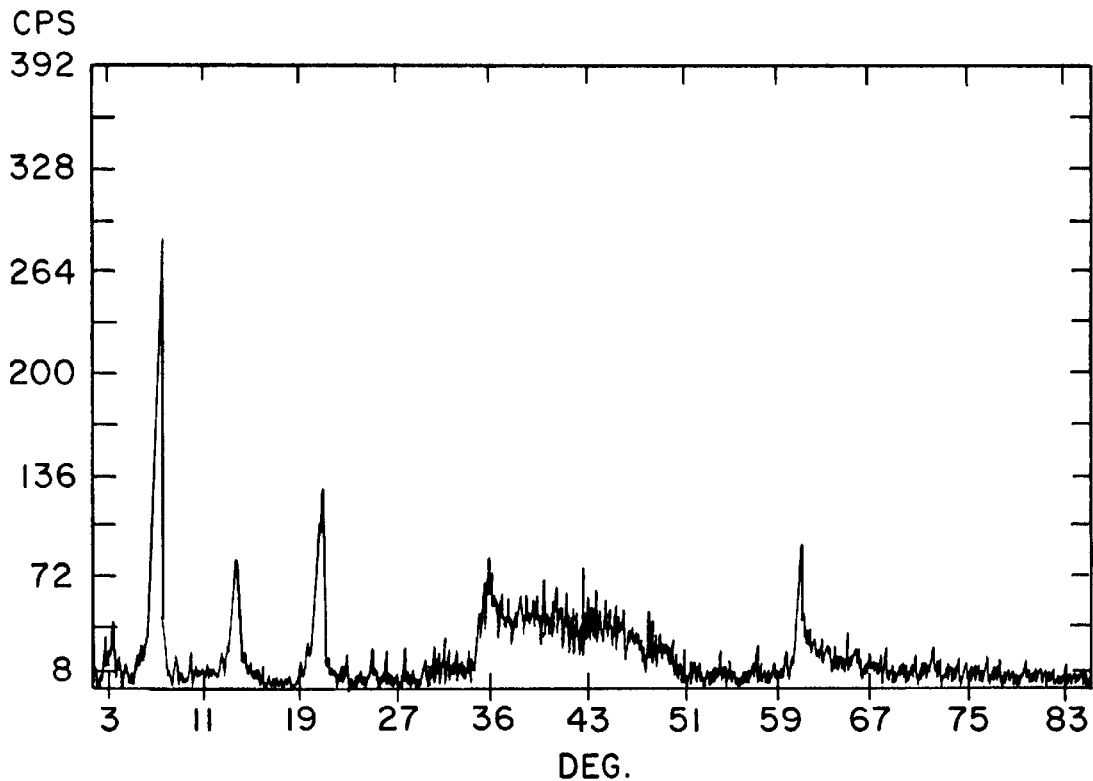
FIG. 4 is the XRD for a 2Mg/1Al ratio precursor material that has been heat age treated; and wherein the effects of an amorphous phase associated with that crystalline phase 2Mg/1Al ratio HTL precursor have been subtracted from the XRD pattern.

As previously discussed, the first embodiment of this invention, among other things, requires that an amorphous and/or non-crystalline HTL phase be present at the end of the slurry or precipitate preparation step. A diffraction pattern for a representative material of this kind is shown in FIG. 1. FIGS. 2–3 show the effects of "low temperature" (i.e., less than about 100° C.) heat aging the material whose XRD pattern is shown in FIG. 1. These figures show the presence of significant amorphous phases, as well as non-HTL crystalline phases. The particular materials associated with these figures were prepared using a 2Mg/1Al molar ratio. In one case, illustrated in FIG. 1, the slurry was not heat aged, while the material whose XRD pattern is shown in FIGS. 2 and 3 was heat aged at about 80–85° C. FIGS. 2 and 3 show that upon being subjected to such low temperature heating, a new crystalline phase nucleates and grows with increasing aging time. FIG. 4 shows the crystalline portion of the phase that was shown in FIG. 2. That is to say that the effects of the presence of the amorphous material that are present in FIG. 2 are "subtracted out" of the XRD pattern shown in FIG. 4.

Figure 5:
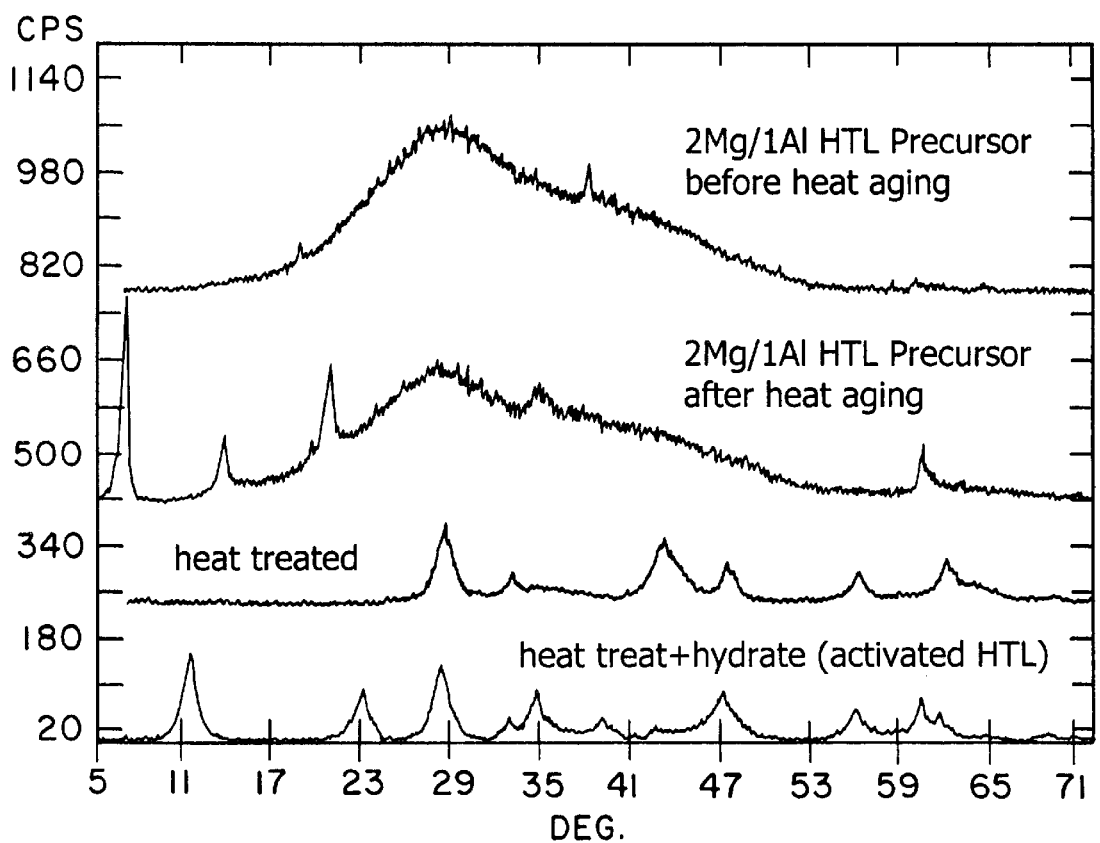
FIG. 5 depicts (via XRD pattern changes) the various phase changes that take place as a result of the activation process of this patent disclosure.

FIG. 5 shows the changes in crystal structure at various steps in applicant's "activation" process. The top two curves in this plot (respectively labeled "2Mg/1Al Precursor before heat aging" and "2Mg/1Al Precursor after heat aging") already have been discussed as part of the previous discussion of FIGS. 1 to 4. The trace in FIG. 5 labeled "heat treated" is representative of the observed phases of HTL structures following Step 1 of applicant's activation process. The trace labeled "heat treat+hydrate (activated HTL)" depicts the results of Step 2 of applicant's activation process. Clearly, an HTL structure has been created. This is evidenced by the presence of all major peaks of an HTL compound, including peaks at about 11.271 degrees, 22.700 degrees and 34.358 degrees manifesting their presence. It also should be noted that FIG. 5 includes the effects of the $CeO_2$ component that was added during the synthesis reaction and whose most prominent peaks manifest themselves at 28.555 degrees, 47.479 degrees and 56.335 degrees.

Figure 6:
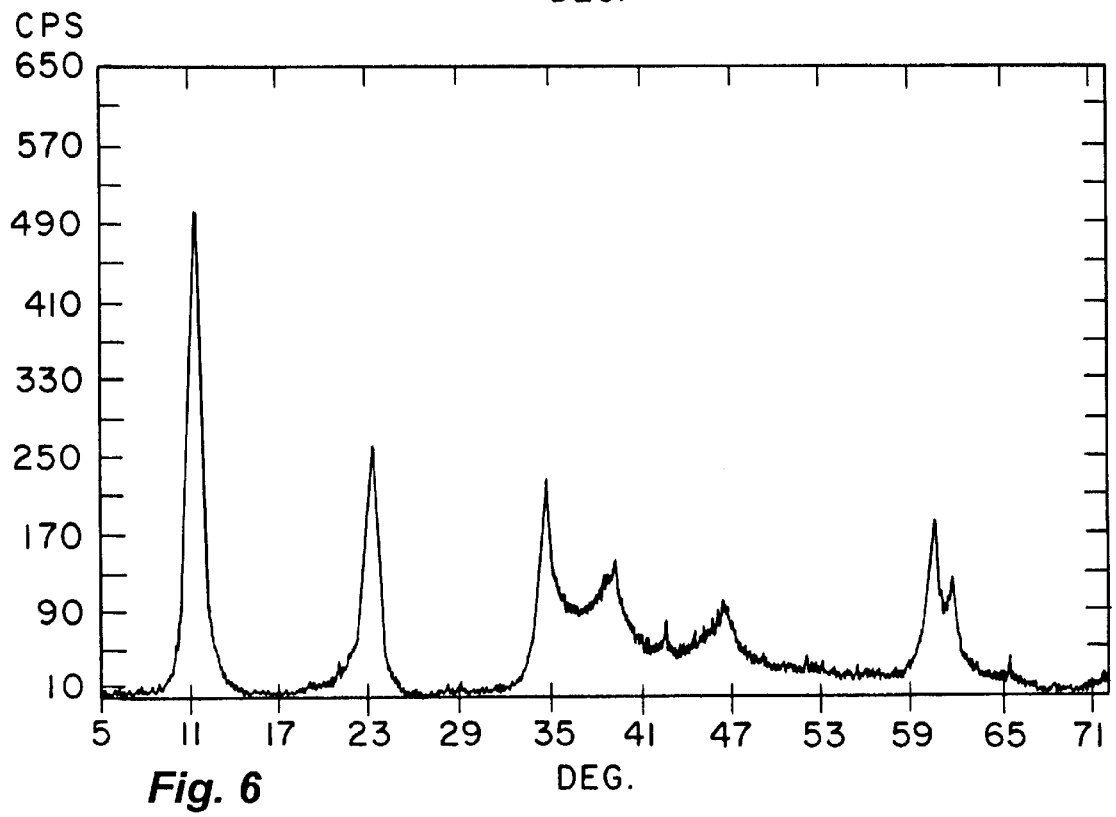
FIG. 6 gives the XRD pattern for a 2Mg/1Al ratio HTL phase produced using applicant's activation process in a case where the starting 2Mg/1Al ratio HTL precursor slurry was not heated.
Figure 7:
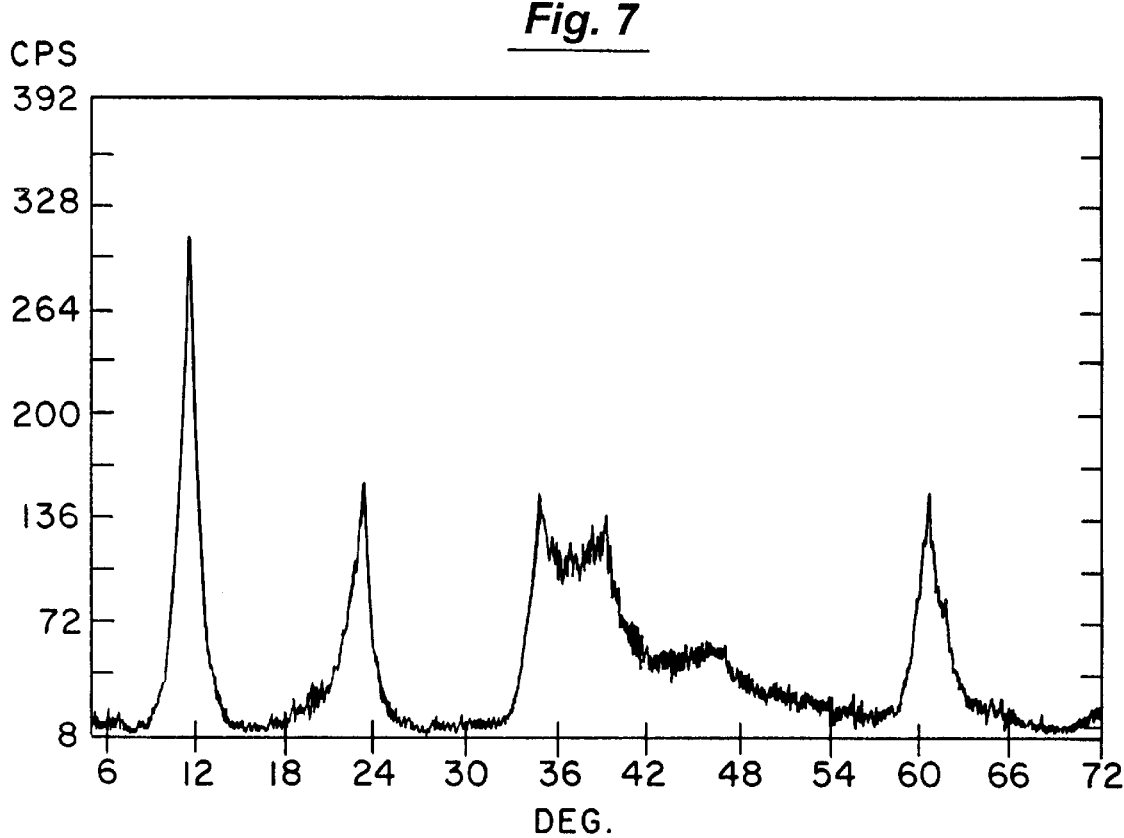
FIG. 7 depicts the XRD for a 2Mg/1Al ratio HTL phase produced by applicant's activation process using a heated 2Mg/1Al HTL precursor slurry.

FIGS. 6 and 7 plot the XRD pattern for a 2Mg/1Al HTL compound that is produced using applicant's activation process. The compound that generated FIG. 6 was derived from an un-heated slurry, while that for FIG. 7 was heat aged. The "stick diagram" (vertical lines of different heights at the appropriate 2θ positions) for the "best matching" ICDD card is superimposed on each of these two plots. In this case the "best match" was with ICDD "card" 35-965 for $Mg_6Al_2(OH)_{18}$—$4.5H_2O$. It also should be emphasized here that certain other ICDD cards (e.g., ICDD card 22-700 for hydrotalcite) reasonably "matched" the peak positions and intensities to give reasonably close correlations, but this particular HTL compound has 2θ peak positions that are nearly identical to those of the 35-965 card. This HTL compound also displayed XRD intensities which had the fewest inconsistencies relative to those of the several candidate cards that were considered. The lattice parameters of both the aged and non-aged slurry example are compared in TABLE II with the "best matching" card, namely, ICDD card 35-965.

TABLE II

| | ICDD Card 35–965 | 2 Mg/1Al HTL (not aged) | 2 Mg/1Al HTL (aged slurry) |
|---|---|---|---|
| a, Angstrom | 3.054 | 3.057 | 3.060 |
| c, Angstrom | 23.40 | 23.05 | 23.08 |
| alpha, degrees | 90 | 90 | 90 |
| beta, degrees | 90 | 90 | 90 |
| gamma, degrees | 120 | 120 | 120 |

It can be seen that the lattice parameter, "a," of applicant's 2Mg/1Al HTL compound is nearly identical to that of the card, while lattice parameter "c" is substantially lower. Applicant believes that this signifies that the amount of $Al^{3+}$ substituted into the brucite-like structure is nearly identical to that of the 35-965 card material, while the variation in lattice parameter c is due to the nature and amount of interlayer water and charge-balancing anions located in the interlayer.

Figure 8:
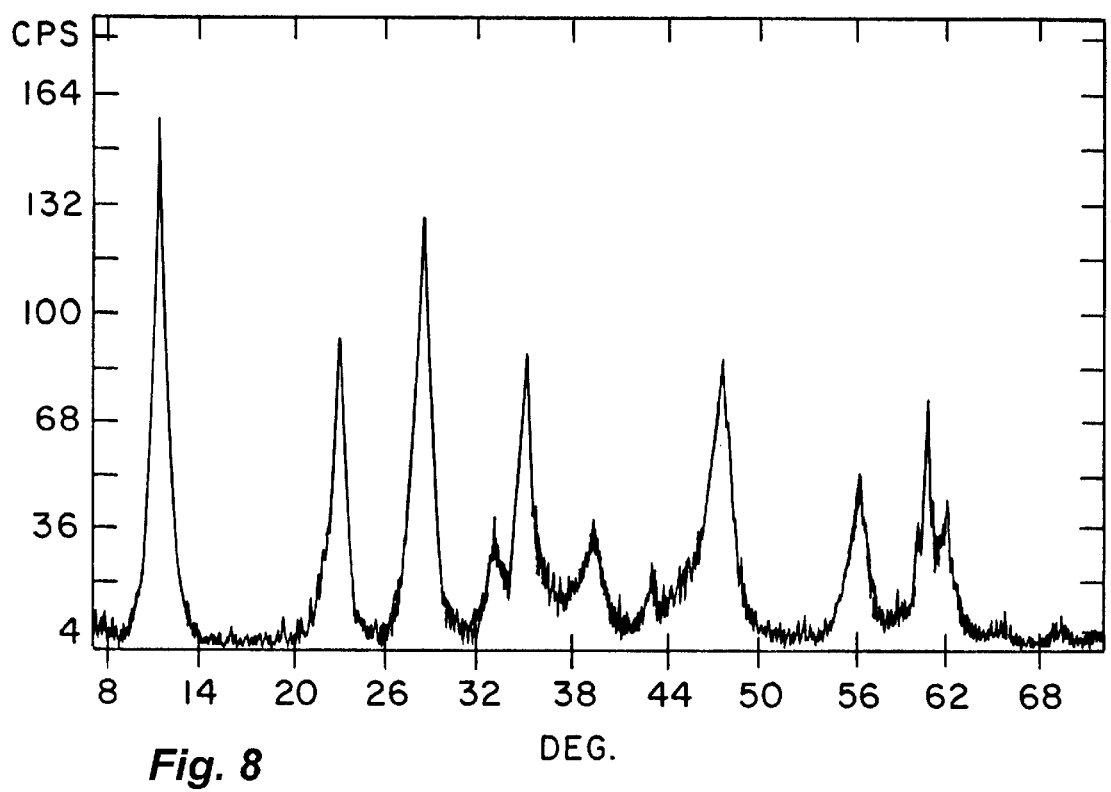
FIG. 8 shows the XRD pattern for a 2Mg/1Al ratio phase material plus oxidants made by applicant's process.

FIG. 8 shows the XRD patterns for the same 2Mg/1Al HTL compound used to generate FIGS. 6 and 7, except that 12 weight percent $CeO_2$ and 3 weight percent $V_2O_5$ components are present by virtue of cerium-containing compound (e.g., cerium nitrate) being added to the slurry formulation after reacting the magnesium and aluminum containing components together. It also should be noted that, with the exception of the effects of the $CeO_2$ present (ICDD Card 34-394) in this system, the pattern is very similar to those samples containing no oxidants (again, see FIGS. 6 and 7).

The following TABLE III compares XRD patterns for HTL compounds with, and without, oxidants as compared to the patterns of the "most closely matching" ICDD card. This comparison shows that the presence of the oxidants in no way affects the structure of the HTL compound.

TABLE III

| | ICDD Card 35–965 | no oxidants | with oxidants $CeO_2$ and $V_2O_5$ |
|---|---|---|---|
| a, Angstrom | 3.054 | 3.057 | 3.046 |
| c, Angstrom | 23.40 | 23.05 | 23.07 |
| alpha, degrees | 90 | 90 | 90 |
| beta, degrees | 90 | 90 | 90 |
| gamma, degrees | 120 | 120 | 120 |

Thus, based upon these and other findings, applicant has concluded that, within a reasonable experimental error allowance for this kind of analysis, no appreciable difference in crystal structure can be observed between HTL compounds associated with $CeO_2$ and $V_2O_5$ oxidants and those without such oxidants.

Figure 9:
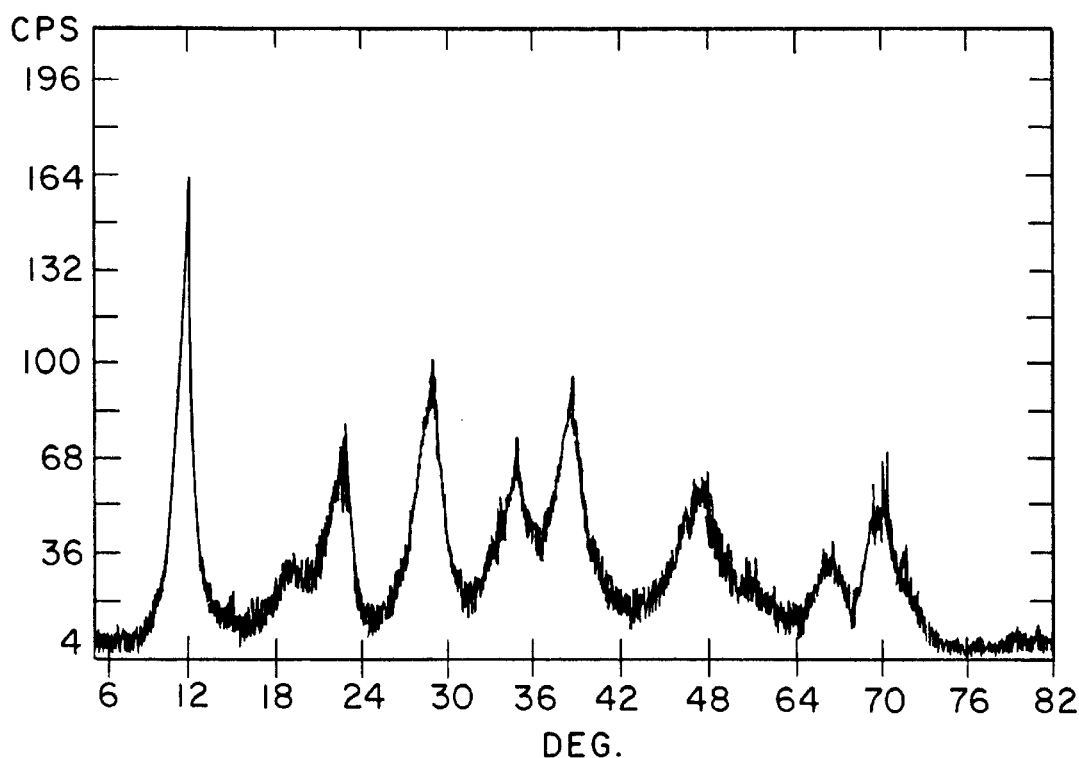
FIG. 9 shows the XRD for a Mg/Al system activated by applicant's process and wherein the system has a 5Mg/1Al molar ratio.

Diffraction patterns showing the effect of a higher Mg/Al ratio (i.e., 5:1) in the HTL structural formation are shown in FIGS. 9. In addition to the HTL compound and oxidant $CeO_2$, a small amount of magnesium hydroxide (ICDD Card 7-239) was observed in the pattern shown in FIG. 10. This result is consistent with results published in the literature in that the maximum HTL formation has been determined by other workers in this art (e.g., Miyata) to be in the Mg/Al ratio range of 2–4. Since the sample that generated FIG. 10 was prepared at a 5Mg/1Al ratio, the amount of magnesium ions present in such a system exceeded the limit of their solubility in the brucite layer—hence a magnesium hydroxide phase was formed and manifested itself in this way.

Figure 10:
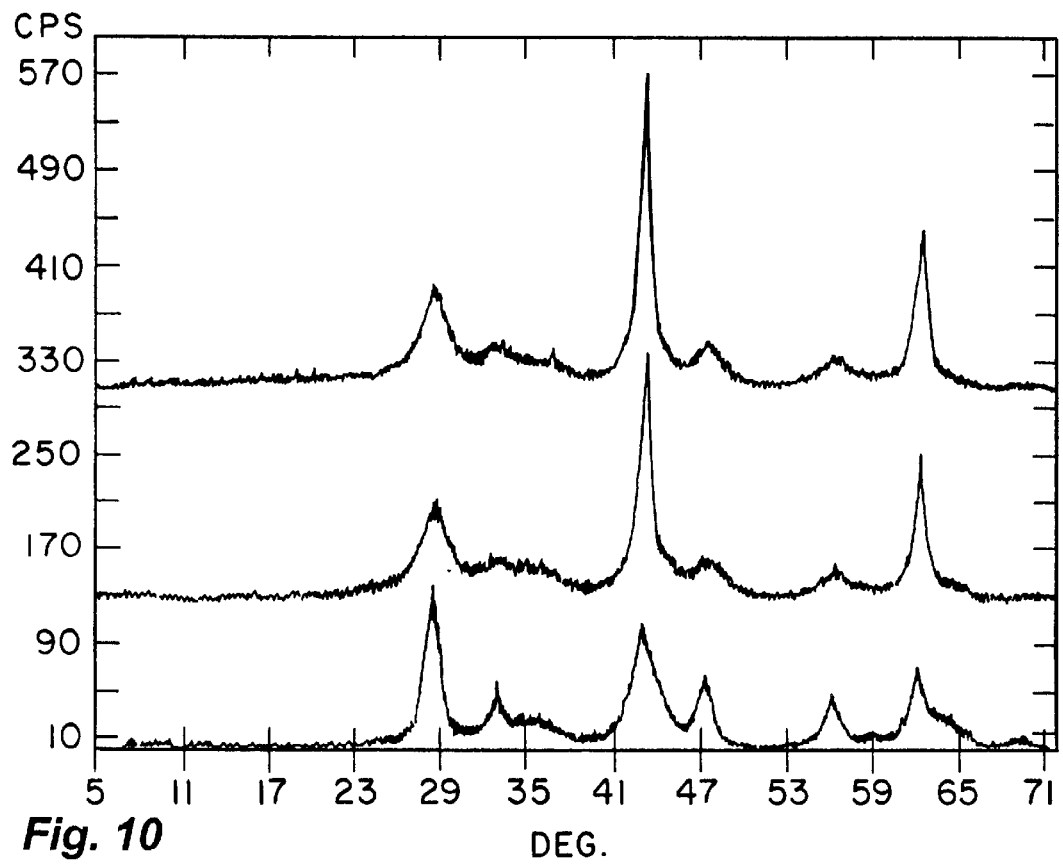
FIG. 10 depicts the effects of a one hour, 500° C. heat treatment on precursor phase with oxidants.

FIG. 10 shows the crystal structure present for HTL precursors materials having differing Mg/Al ratios just prior to Step 2 of applicant's activation process. Of particular interest here are the "shoulders" on the 43 degree and 62 degree "MgO-like" peaks of these diffractograms. It can be seen that, as the Mg/Al ratio increases from 2:1 to 5:1, the magnitude of these peaks diminishes to a level where they become undetectable. This is indicative of a metastable alumina phase, with or without a small amount of magnesium oxide dissolved in the lattice. Additionally, this result shows that alumina is present, primarily within the lattice of the MgO, and hence the term "MgO-like" compounds also might be applied to those HTL compounds that have undergone applicant's Step 2 heat treatment—but no hydration. The metastable alumina phase is a direct corollary to the 5Mg/1Al material previously discussed wherein the presence of "too many" Mg ions resulted in an excess that manifested itself as a magnesium hydroxide phase. In this case, "too low" a Mg/Al ratio results in an excess of alumina which can be regarded as a slightly magnesia-rich alumina phase. This observation has been made in the literature as well; see, for example, Gastuche et al, Mixed Magnesium-Aluminum Hydroxides, *Clay Minerals* 7, 7 (1967), particularly noting FIG. 1 therein. See also the previously noted Miyata reference, (and especially page 52 thereof).

Thus, for maximum HTL formation by applicant's processes, hydrotalcite-like compounds having a Mg/Al ratio in the 2–4 range are highly preferred. When the Mg/Al ratio drops below 2, a HTL structure can result, but it will be mixed with alumina and or a magnesium-aluminum solid solution phase. The lattice parameter, a, of such a system, however, generally, will remain unchanged at about 3.04 Angstroms. In a system having a Mg/Al ratio in the range of 2–4, the lattice parameter, a, will increases with a linear relationship toward an endpoint associated with magnesium hydroxide of 3.14–3.15 Angstroms. Above a Mg/Al ratio of 4, the lattice parameter continues to increase further, but magnesium hydroxide will accompany the HTL phase formation. See again, for example, the previously cited Miyata reference and the Gastuche et al. reference (and especially FIG. 1, on pg 182 thereof).

The effects of increased temperature of applicant's activation process with respect to crystal structure was also studied. This study verified the literature's pronouncements with respect to the temperature at which spinel is formed from hydrotalcite. For example, applicant subjected a commercially available hydrotalcite compound to such a rising temperature regime in order to verify the temperature at which spinel is formed from hydrotalcite. The commercially available hydrotalcite was Alcoa's HTC-30® product (which has a 3:1 Mg/Al molar ratio and is therefore well suited to use in the second embodiment of applicant's invention), and it was subjected to temperatures that ranged from 250° C. to 1200° C. This test showed Mgo-like phase formation commencing at 400° C. and spinel formation commencing at 900° C.

The results of some other analogous heat treatments, carried out at higher heat treatment temperatures, is presented in FIGS. 11 and 12. In these increased temperature studies, a 732° C. temperature was used for one hour as the heat treatment aspect of applicant's overall "activation" step since the literature states that this is near the upper-end of preferred temperature for maximum HTL phase formation. In any case, no appreciable differences in structure are noted beyond those already noted for lower temperature activations (e.g., at 450–500° C.).

TGA-$SO_x$ testing of Sorbents

Figure 13:
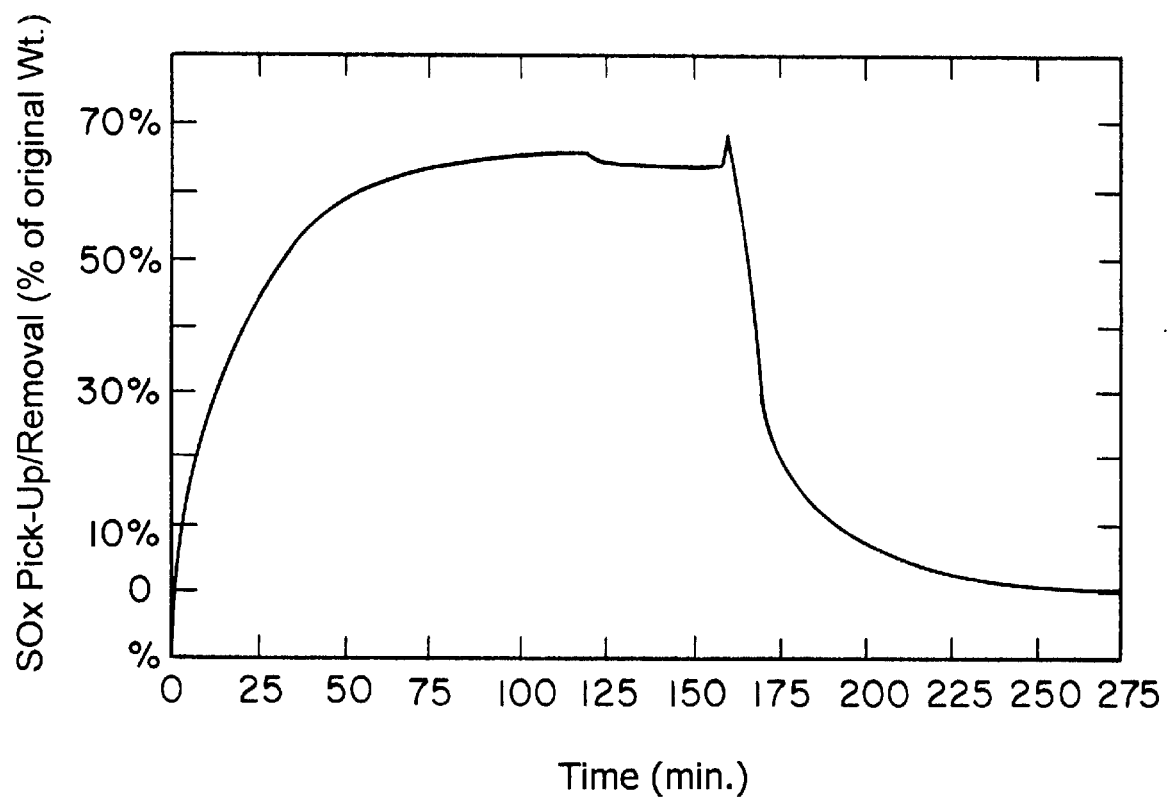
FIG. 13 is a TGA/$SO_x$ Sorption and Release trace for a 3Mg/1Al HTL system prepared by applicant's process.

A modified Thermal Gravimetric Analysis (TGA) technique is used by many laboratories worldwide to evaluate the relative $SO_x$ sorbent performance of different compositions. This modified technique employs two tests, which are carried out at different temperatures. The first test is a $SO_x$ "pickup." In this aspect of the TGA test, a furnace is ramped up to about 700° C. in an inert gas and allowed to equilibrate. A gas mixture containing $SO_2$ and $O_2$ is then introduced into the reactor for some duration. It should be understood that two distinct reactions are simultaneously occurring at this point: Oxidation of $SO_2 \rightarrow SO_3$ and a subsequent reaction of the $S_3$ thus formed with MgO to form $MgSO_4$. Typically, the reaction is allowed to continue until the sample is saturated (meaning all the possible MgO is reacted to form the sulfate). The second aspect of the TGA is to regenerate the sorbent. This is achieved through use of a lower temperature (typically 590° C.) and a reducing atmosphere (typically $H_2$), so that the sorbent being studied releases the sorbed $SO_x$ as $H_2S$. The TGA-$SO_x$ plot for one cycle of such a test on one of applicant's HTL compounds is shown in FIG. 13.

Methods for Forming HTL Compositions which are Particularly Resistant to Mechanical Stress.

The HTL compounds of this invention can be formed into various shapes (particles, microspheroidal particles, extrudates, pellets) which are harder and more dense than HTL compounds made by prior art processes. These qualities make applicant's HTL compounds more useful for certain applications e.g., catalysts, sorbents in general (and $SO_x$ sorbents in particular), ion exchange pellets (e.g., for water softeners). If made according to the teachings of this patent disclosure, such physical forms will display greater resistance to wear, attrition, or impact, as well as improvement (i.e., increase) in the bulk density of the HTL compounds formed by applicant's methods.

The following Table IV summarizes improvements in two physical properties (i.e., attrition index and apparent bulk density ("ABD")) for various samples that were spray dried into particle forms and activated according to the teachings of this patent disclosure. This activation method would also be applicable to other physical forms of such HTL compounds, e.g., extrudates, pellets or beads.

TABLE IV

| HTL Composition | Attrition Index (ASTM) | *ABD (g/cc) |
|---|---|---|
| 2 Mg/1Al (Step 1 Activation) | 3.9 | 0.39 |
| 2 Mg/1Al (Step 2 Activation) | 0.54 | 0.96 |
| 5 Mg/1Al (Step 1 Activation) | 15 | 0.36 |
| 5 Mg/1Al (Step 2 Activation) | 0.65 | 0.75 |

*Apparent Bulk Density

The 2Mg/1Al sample described in Table IV also was subjected to an additional heat treatment step at 732° C./1 hr. This additional heat treatment has been described as an optional, "Step 3" in previous parts of this patent disclosure. This additional heating was performed to show that applicant's "activation" was of irreversible nature, meaning the physical properties do not revert to the original activation values. Therefore, applicant considers the products of this "activation" to be new compositions of matter. In any case, the results of this Step 3 process are shown in Table V.

TABLE V

| HTL Composition | Attrition Index (ASTM) | *ABD (g/cc) |
|---|---|---|
| 2 Mg/1A1 (Step 1 Activation) | 3.9 | 0.96 |
| 2 Mg/1A1 (Step 2 Activation) | 0.54 | 0.96 |
| 2 Mg/1A1 (Additional heat to 732° C./1 hr.) | 0.81 | 0.80 |

Applicability of Activation Process toward HTL Compounds which Crystallize with HTL Structure during Slurry Synthesis.

The aforementioned activation process (i.e., heat treatment followed by hydration) can be applied to HTL compounds that are used as starting materials in the second embodiment of applicant's invention. That is to say that a HTL compound can be heat treated to form a "collapsed" or "metastable" material that can be rehydrated in the same manner that the heat treated material of the first embodiment of applicant's invention was hydrated. If so heat treated, the hydration process of the second embodiment of this invention will result in formation of a HTL phase. Here again, applicant's activation process improves the physical characteristics of the HTL materials produced by said process. Again, these improvements include, but are not limited to, improved mechanical strength and density of the formed shapes (e.g., FCC particles, fixed bed pellets, anion exchange beads, etc.) relative to comparable compounds that do not experience applicant's activation process. It also should be noted that, for those materials which form HTL compounds from HTL starting materials (i.e., the second embodiment of applicant's invention), the resulting HTL phase may or may not be exactly identical to the starting HTL phase (in terms of exact identity of peak position and intensity), but which will nonetheless display clearly identifiable HTL compound peaks and possess the above-noted improved physical characteristics.

To show this advance, an example is given of a HTL containing $SO_x$ sorbent (marketed by Akzo Nobel under the trade name "KDESOX®") that was subjected to applicant's activation process. The following TABLE VI summarizes the physical characteristics of the HTL-containing composition, before and after Applicant's activation process.

TABLE VI

| HTL Composition | KDESOX (as received) | KDESOX "Activated" |
|---|---|---|
| Attrition Index, ASTM | 1.8 | 0.77 |
| Bulk Density, g/cc | 0.81 | 0.97 |

Thus, the physical properties (shown here as attrition index and bulk density) of a commercial available HTL compound made into FCC particles can be improved markedly by subjecting them to applicant's Activation process.

While this invention has been described with respect to various theories, specific examples and a spirit which is committed to the concept of the use of an "activation process" that is based upon heat treatment and hydration of collapsed, HTL-forming, compounds, the full scope of this invention relates to such activation of anionic clays in general; hence the full scope of this invention should be regarded as being limited only by the claims that follow.

Thus, having disclosed this invention, what is claimed is:
1. A process for making an anionic clay compound, said process comprising:
    (1) preparing a reaction mixture comprising a divalent metal-containing compound and a trivalent metal-containing compound under conditions such that a product obtained from the reaction mixture is a non-anionic clay compound;
    (2) heat treating the non-anionic clay compound to create a heat treated, non-anionic clay compound; and
    (3) hydrating the heat treated, non-anionic clay compound to obtain an anionic clay compound.
2. The process of claim 1 wherein the anionic clay compound is subjected to a second heat treatment to form a "collapsed" anionic clay compound.
3. The process of claim 1 wherein the product obtained from the reaction mixture is low temperature heated at a temperature less than 250° C.
4. The process of claim 1 wherein the heat treating of the non-anionic clay compound is carried out at a temperature between about 300° C. and 850° C.
5. The process of claim 1 wherein the anionic clay compound is converted into a particulate physical form prior to being heat treated and hydrated.
6. The process of claim 1 wherein the reaction mixture further comprises a metallic oxidant selected from the group consisting of cerium, vanadium, platinum, palladium, rhodium, iridium, molybdenum, tungsten, copper, chromium nickel, manganese, cobalt, iron, ytterbium and uranium.
7. The process of claim 1 wherein the anionic clay compound is impregnated with a solution containing a metallic oxidant selected from the group consisting of cerium, vanadium, platinum, palladium, rhodium, iridium, molybdenum, tungsten, copper, chromium, nickel, manganese, cobalt, iron, ytterbium and uranium.
8. A process for making an anionic clay compound-based $SO_x$ sorbent, said process comprising:
    (1) preparing a reaction mixture comprising a divalent metal-containing compound, a trivalent metal-containing compound, a cerium-containing compound and a vanadium-containing compound under conditions such that a product obtained from the reaction mixture is a non-anionic clay compound/cerium-containing compound/vanadium-containing compound mixture;
    (2) converting the non-anionic clay compound/cerium-containing compound/vanadium-containing compound mixture into a microspheroidal form suitable for use as a $SO_x$ sorbent;
    (3) heat treating the non-anionic clay compound/cerium-containing compound/vanadium-containing compound mixture at 300° C. to 850° C. to obtain a collapsed, heat treated, non-anionic clay compound/cerium containing compound/vanadium containing compound mixture;
    (4) hydrating the collapsed, heat treated, non-anionic clay compound/cerium-containing compound/vanadium-containing compound mixture to obtain an anionic clay compound/cerium-containing compound/vanadium-containing compound material suitable for use as a $SO_x$ sorbent.
9. The process of claim 8 wherein the anionic clay compound/cerium-containing compound/vanadium-containing compound material is subjected to a second heat treatment to form a "collapsed" anionic clay forming compound/cerium-containing compound/vanadium-containing compound material suitable for use as a $SO_x$ sorbent.

10. A process for making a hydrotalcite-like compound, said process comprising:
(1) preparing a reaction mixture comprising an aluminum-containing compound and a magnesium-containing compound under conditions such that a product obtained from the reaction mixture is a non-hydrotalcite-like compound;
(2) heat treating the non-hydrotalcite-like compound to create a heat treated, non-hydrotalcite-like compound; and
(3) hydrating the heat treated, non-hydrotalcite-like compound to obtain a hydrotalcite-like compound.

11. The process of claim 10 wherein the hydrotalcite-like compound is subjected to a second heat treatment to form a "collapsed" hydrotalcite compound.

12. The process of claim 10 wherein the product obtained from the reaction mixture is heated at a temperature less than 250° C.

13. The process of claim 10 wherein the heat treating of the non-hydrotalcite-like compound is carried out at a temperature between about 300° C. and 850° C.

14. The process of claim 10 wherein the hydrotalcite-like compound is converted into a particulate physical form prior to being heat treated and hydrated.

15. The process of claim 10 wherein the reaction mixture further comprises a metallic oxidant selected from the group consisting of cerium, vanadium, platinum, palladium, rhodium, iridium, molybdenum, tungsten, copper, chromium, nickel, manganese, cobalt, iron, ytterbium and uranium.

16. The process of claim 10 wherein the hydrotalcite-like compound is impregnated with a solution containing a metallic oxidant selected from the group consisting of cerium, vanadium, platinum, palladium, rhodium, iridium, molybdenum, tungsten, copper, chromium, nickel, manganese, cobalt, iron, ytterbium and uranium.

17. A process for making a hydrotalcite-like compound-based $SO_x$ sorbent, said process comprising:
(1) preparing a reaction mixture comprising an aluminum-containing compound, a magnesium-containing compound, a cerium-containing compound and a vanadium-containing compound under conditions such that a product obtained from the reaction mixture is a non-hydrotalcite-like compound/ceria-containing compound/vanadium-containing compound mixture;
(2) converting the non-hydrotalcite-like compound/ceria-containing compound/vanadium-containing compound mixture into a microspheroidal form suitable for use as a $SO_x$ sorbent;
(3) heat treating the non-hydrotalcite-like compound/ cerium-containing compound/vanadium-containing compound mixture at 300° C. to 850° C. to obtain a collapsed heat treated, non-hydrotalcite-like compound/cerium-containing compound/vanadium-containing compound mixture;
(4) hydrating the collapsed heat treated, non-hydrotalcite-like compound/ceria-containing compound/vanadium-containing compound mixture to obtain a hydrotalcite-like compound/cerium-containing compound/ vanadium-containing compound material suitable for use as a $SO_x$ sorbent.

18. The process of claim 17 wherein the hydrotalcite-like compound is subjected to a second heat treatment to form a "collapsed" hydrotalcite-forming compound/cerium-containing compound/vanadium-containing compound material suitable for use as a $SO_x$ sorbent.

* * * * *

UNITED STATES PATENT AND TRADEMARK OFFICE
CERTIFICATE OF CORRECTION

PATENT NO : 6,028,023
DATED : February 22, 2000
INVENTOR(S): Albert A. Vierheilig It is certified that error appears in the above-identified patent and that said Letters Patent are hereby corrected as shown below:

Column 24, claim 5, line 21, please delete the word "anionic" and substitute therefore the expression -- non-anionic --.

Column 25, claim 14, line 23, please delete the expression "hydrotalcite-like" and substitute therefore the expression -- non-hydrotalcite-like --.

Signed and Sealed this

Third Day of April, 2001

Attest:

NICHOLAS P. GODICI

Attesting Officer

Acting Director of the United States Patent and Trademark Office